US012651571B2

(12) United States Patent
Yuan et al.

(10) Patent No.: US 12,651,571 B2
(45) Date of Patent: Jun. 9, 2026

(54) DISPLAY SUBSTRATE, DRIVING METHOD AND DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN); Beijing BOE Technology Development Co., Ltd., Beijing (CN)

(72) Inventors: Changlong Yuan, Beijing (CN); Zhenhua Zhang, Beijing (CN); Li Zhu, Beijing (CN); Jingyi Feng, Beijing (CN); Xilei Cao, Beijing (CN); Wulin Shen, Beijing (CN); Zhen Liu, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/857,165

(22) PCT Filed: Sep. 28, 2023

(86) PCT No.: PCT/CN2023/122525

§ 371 (c)(1),
(2) Date: Oct. 15, 2024

(87) PCT Pub. No.: WO2024/114092

PCT Pub. Date: Jun. 6, 2024

(65) Prior Publication Data

US 2025/0273142 A1 Aug. 28, 2025

(30) Foreign Application Priority Data

Nov. 28, 2022 (WO) ................ PCT/CN2022/134737
Jul. 28, 2023 (CN) ......................... 202310945657.4

(51) Int. Cl.
*G09G 3/3233* (2016.01)

(52) U.S. Cl.
CPC ... *G09G 3/3233* (2013.01); *G09G 2300/0408* (2013.01); *G09G 2300/0819* (2013.01);
(Continued)

(58) Field of Classification Search
CPC ..... H10K 59/00–95; G09G 2300/0426; G09G 3/3233; G09G 2300/081; G09G 3/3225;
(Continued)

(56) References Cited

U.S. PATENT DOCUMENTS 11,170,719 B1 11/2021 Lu et al.
2011/0164016 A1 7/2011 Kang et al.
(Continued)

FOREIGN PATENT DOCUMENTS

CN 101908316 A 12/2010
CN 102930822 A 2/2013
(Continued)

OTHER PUBLICATIONS

ISA China National Intellectual Property Administration, International Search Report and Written Opinion Issued in Application No. PCT/CN2022/134737, Aug. 17, 2023, WIPO, 13 pages. (Submitted with Partial Translation).
(Continued)

*Primary Examiner* — Sanjiv D. Patel
(74) *Attorney, Agent, or Firm* — McCoy Russell LLP

(57) ABSTRACT

A display substrate includes a plurality of rows of pixel circuits; the pixel circuit includes at least one of a first light
(Continued)

emitting control circuit, a second light emitting control circuit, and a first reset circuit; the pixel circuit also includes a light emitting element, a driving circuit, a first energy storage circuit, and a second energy storage circuit; the first light emitting control circuit controls the connection between the first node and the fourth node under the control of a first light emitting control signal; the second light emitting control circuit controls the connection the power supply voltage terminal and the first terminal of the driving circuit under the control of a second light emitting control signal; the first reset circuit controls a potential of the third node under the control of a first reset signal.

18 Claims, 31 Drawing Sheets

(52) U.S. Cl.
CPC ............... *G09G 2300/0852* (2013.01); *G09G 2300/0861* (2013.01); *G09G 2310/08* (2013.01)

(58) Field of Classification Search
CPC ... G09G 2300/0861; G09G 2310/0262; G09G 3/32
See application file for complete search history.

(56) References Cited

U.S. PATENT DOCUMENTS

| | | | | |
|---|---|---|---|---|
| 2013/0335399 | A1 | 12/2013 | Tsuge | |
| 2014/0111490 | A1 | 4/2014 | Lee et al. | |
| 2015/0243203 | A1 | 8/2015 | Kim et al. | |
| 2017/0270867 | A1 | 9/2017 | Zhu et al. | |
| 2018/0082652 | A1 | 3/2018 | Lv et al. | |
| 2020/0066212 | A1* | 2/2020 | Kim | G09G 3/3266 |
| 2020/0168156 | A1 | 5/2020 | Yin | |
| 2021/0125547 | A1 | 4/2021 | Lin et al. | |
| 2022/0101777 | A1* | 3/2022 | Kim | G09G 3/3208 |
| 2022/0115485 | A1* | 4/2022 | Yu | H10K 59/353 |
| 2022/0351671 | A1 | 11/2022 | Xu et al. | |
| 2023/0419896 | A1 | 12/2023 | Zhang | |
| 2024/0119897 | A1 | 4/2024 | Zhang et al. | |

FOREIGN PATENT DOCUMENTS

| | | | |
|---|---|---|---|
| CN | 104599637 | A | 5/2015 |
| CN | 104700778 | A | 6/2015 |
| CN | 106297662 | A | 1/2017 |
| CN | 205984242 | U | 2/2017 |
| CN | 106531074 | A | 3/2017 |
| CN | 107068060 | A | 8/2017 |
| CN | 108520726 | A | 9/2018 |
| CN | 109872692 | A | 6/2019 |
| CN | 110675829 | A | 1/2020 |
| CN | 111179836 | A | 5/2020 |
| CN | 112687189 | A | 4/2021 |
| CN | 112885850 | A | 6/2021 |
| CN | 113506540 | A | 10/2021 |
| CN | 113744683 | A | 12/2021 |
| CN | 113838421 | A | 12/2021 |
| CN | 215265531 | U | 12/2021 |
| CN | 114175257 | A | 3/2022 |
| CN | 114241978 | A | 3/2022 |
| CN | 114255708 | A | 3/2022 |
| CN | 114648948 | A | 6/2022 |
| CN | 114664253 | A | 6/2022 |
| CN | 114708838 | A | 7/2022 |
| CN | 114783357 | A | 7/2022 |
| JP | 2003114657 | A | 4/2003 |
| JP | 2010197544 | A | 9/2010 |
| JP | 2016027364 | A | 2/2016 |
| KR | 20210131852 | A | 11/2021 |

OTHER PUBLICATIONS

ISA China National Intellectual Property Administration, International Search Report and Written Opinion Issued in Application No. PCT/CN2023/110336, Nov. 9, 2023, WIPO, 15 pages. (Submitted with Partial Translation).
ISA China National Intellectual Property Administration, International Search Report and Written Opinion Issued in Application No. PCT/CN2023/113860, Nov. 10, 2023, WIPO, 20 pages. (Submitted with Partial Translation).
European Patent Office, Extended European Search Report Issued in Application No. 23867136.6, Apr. 16, 2025, Germany, 21 pages.
United States Patent and Trademark Office, Non-Final Office Action Issued in U.S. Appl. No. 18/695,638, filed Aug. 19, 2025, 31 pages.
European Patent Office, Extended European Search Report Issued in Application No. 23896249.2, Aug. 20, 2025, Germany, 24 pages.
United States Patent and Trademark Office, Non-Final Office Action Issued in U.S. Appl. No. 18/874,562, filed Oct. 7, 2025, 21 pages.

* cited by examiner

DISPLAY SUBSTRATE, DRIVING METHOD AND DISPLAY DEVICE

CROSS-REFERENCE TO RELATED APPLICATIONS

The present disclosure is the U.S. national phase of PCT Application No. PCT/CN2023/122525 filed on Sep. 28, 2023, which claims the priorities of PCT Application No. PCT/CN2022/134737 filed on Nov. 28, 2022, and Chinese Application No. 202310945657.4 filed on Jul. 28, 2023, which are incorporated herein by reference in their entireties for all purposes.

TECHNICAL FIELD

The present disclosure relates to the field of display technology, in particular to a display substrate, a driving method and a display device.

BACKGROUND

In the related art, the pixel circuit can realize the separation of the two processes of threshold voltage compensation and signal writing-in, which is beneficial to the full compensation of the threshold voltage during high-frequency driving. However, the related pixel circuit requires multiple groups of gate driving units to provide various control signals, which is not conducive to the reduction of the border.

SUMMARY

In one aspect, the present disclosure provides in some embodiments a display substrate, including a plurality of rows of pixel circuits; wherein the pixel circuit includes at least one of a first light emitting control circuit, a second light emitting control circuit, and a first reset circuit; the pixel circuit also includes a light emitting element, a driving circuit, a first energy storage circuit, and a second energy storage circuit; a control terminal of the driving circuit is electrically connected to a first node, a first terminal of the second energy storage circuit is electrically connected to a second node, a second terminal of the second energy storage circuit is electrically connected to a third node, a first terminal of the first energy storage circuit is electrically connected to the third node, and a second terminal of the first energy storage circuit is electrically connected to a fourth node; the first energy storage circuit and the second energy storage circuit are configured to store electrical energy; the first light emitting control circuit is electrically connected to a first light emitting control line, the first node, and the fourth node, respectively, and is configured to control the connection between the first node and the fourth node under the control of a first light emitting control signal provided by the first light emitting control line; the second light emitting control circuit is electrically connected to a second light emitting control line, a power supply voltage terminal, and the first terminal of the driving circuit, is configured to control the connection the power supply voltage terminal and the first terminal of the driving circuit under the control of a second light emitting control signal provided by the second light emitting control line; the first reset circuit is electrically connected to a first reset line and the third node respectively, and is configured to control a potential of the third node under the control of a first reset signal provided by the first reset line; the second terminal of the driving circuit is electrically connected to the light emitting element, and the driving circuit is configured to generate a driving current to drive the light emitting element under the control of the potential of the first node; the control signal line includes at least one of the first light emitting control line, the second light emitting control line, and the first reset line; control signal lines included in at least two rows of pixel circuits included in the plurality of rows of pixel circuits are electrically connected to each other.

Optionally, the pixel circuit further includes a second reset circuit; the second reset circuit is electrically connected to a first reset line and the first node, respectively, is configured to control the potential of the first node under the control of a first reset signal; or, the second reset circuit is electrically connected to a second reset line and the first node, respectively, is configured to control the potential of the first node under the control of a second reset signal provided by the second reset line.

Optionally, the first reset circuit is also electrically connected to a reference voltage terminal, and is configured to write a reference voltage into the third node under the control of the first reset signal; the reference voltage terminal is configured to provide the reference voltage; the second reset circuit is also electrically connected to the reference voltage terminal, and is configured to write the reference voltage into the first node under the control of the first reset signal; or, the first reset circuit is also electrically connected to the first node, and is configured to control the connection between the first node and the third node under the control of the first reset signal; the second reset circuit is also electrically connected to the reference voltage terminal, and is configured to write the reference voltage into the first node under the control of the first reset signal; or, the first reset circuit is also electrically connected to the reference voltage terminal, and is configured to write the reference voltage into the third node under the control of the first reset signal; the second reset circuit is also electrically connected to the third node, is configured to control the connection between the first node and the third node under the control of the first reset signal; or, the first reset circuit is also electrically connected to an initial voltage terminal, is configured to write an initial voltage provided by the initial voltage terminal into the third node under the control of the first reset signal; the second reset circuit is also electrically connected to the power supply voltage terminal, is configured to write a power supply voltage provided by the power supply voltage terminal into the first node under the control of the first reset signal.

Optionally, the pixel circuit further includes a data writing-in circuit; the data writing-in circuit is electrically connected to a scanning line, a data line and the fourth node respectively, and is configured to write a data voltage provided by the data line into the fourth node under the control of a scanning signal provided by the scanning line.

Optionally, the pixel circuit further comprises a third light emitting control circuit; the third light emitting control circuit is electrically connected to the scanning line, the second node and the first electrode of the light emitting element respectively, and is configured to control the connection between the second node and a first electrode of the light emitting element under the control of the scanning signal provided by the scanning line; a second electrode of the light emitting element is electrically connected to the first voltage terminal.

Optionally, the pixel circuit further comprises a third light emitting control circuit; the third light emitting control circuit is electrically connected to a third light emitting control line, the second node and the first electrode of the light emitting element respectively, and is configured to control the connection between the second node and the first electrode of the light emitting element under the control of a third light emitting control signal provided by the third light emitting control line; the second electrode of the light emitting element is electrically connected to the first voltage terminal.

Optionally, the pixel circuit further comprises a third reset circuit; the third reset circuit is electrically connected to a second reset line, an initial voltage terminal and a first electrode of the light emitting element, respectively, and is configured to write an initial voltage provided by the initial voltage terminal into the first electrode of the light emitting element under the control of a second reset signal provided by the second reset line.

Optionally, the first light emitting control circuit includes a first transistor, and the second light emitting control circuit includes a second transistor; a gate electrode of the first transistor is electrically connected to the first light emitting control line, a first electrode of the first transistor is electrically connected to the first node, and a second electrode of the first transistor is electrically connected to the fourth node; a gate electrode of the second transistor is electrically connected to the second light emitting control line, a first electrode of the second transistor is electrically connected to the power supply voltage terminal, and a second electrode of the second transistor is electrically connected to the first terminal of the driving circuit.

Optionally, in at least two adjacent rows of pixel circuits included in the plurality of rows of pixel circuit, first light emitting control lines electrically connected to the first transistor are electrically connected to each other; and/or, second light emitting control lines electrically connected to the second transistor are electrically connected to each other.

Optionally, the driving circuit includes a driving transistor, the first energy storage circuit includes a first capacitor, and the second energy storage circuit includes a second capacitor; a first terminal of the first capacitor is electrically connected to the third node, and a second terminal of the first capacitor is electrically connected to the fourth node; a first terminal of the second capacitor is electrically connected to the second node, and a second terminal of the second capacitor is electrically connected to the third node; a gate electrode of the driving transistor is electrically connected to a control terminal of the driving circuit, a first electrode of the driving transistor is electrically connected to a first terminal of the driving circuit, and a second electrode of the driving transistor is electrically connected to a second terminal of the driving circuit.

Optionally, the first reset circuit includes a third transistor, and the second reset circuit includes a fourth transistor; a gate electrode of the third transistor is electrically connected to the first reset line, a first electrode of the third transistor is electrically connected to the reference voltage terminal or the initial voltage terminal, and a second electrode of the third transistor is electrically connected to the third node; a gate electrode of the fourth transistor is electrically connected to the first reset line, a first electrode of the fourth transistor is electrically connected to the reference voltage terminal or the power supply voltage terminal, and a second electrode of the fourth transistor is electrically connected to the first node.

Optionally, the first reset circuit includes a third transistor, and the second reset circuit includes a fourth transistor; a gate electrode of the third transistor is electrically connected to the first reset line, a first electrode of the third transistor is electrically connected to the first node, and a second electrode of the third transistor is electrically connected to the third node; a gate electrode of the fourth transistor is electrically connected to the first reset line, a first electrode of the fourth transistor is electrically connected to the reference voltage terminal, and a second electrode of the fourth transistor is electrically connected to the first node.

Optionally, in the first reset circuit includes a third transistor, and the second reset circuit includes a fourth transistor; a gate electrode of the third transistor is electrically connected to the first reset line, a first electrode of the third transistor is electrically connected to the reference voltage terminal, and a second electrode of the third transistor is electrically connected to the third node; a gate electrode of the fourth transistor is electrically connected to the first reset line, a first electrode of the fourth transistor is electrically connected to the third node, and a second electrode of the fourth transistor is electrically connected to the first node.

Optionally, in at least two adjacent rows of pixel circuits included in the plurality of rows of pixel circuit, first reset lines electrically connected to the third transistor are electrically connected to each other; and/or, first reset lines electrically connected to the fourth transistor are electrically connected to each other.

Optionally, the data writing-in circuit includes a fifth transistor, and the third light emitting control circuit includes a sixth transistor; a gate electrode of the fifth transistor is electrically connected to the scanning line, a first electrode of the fifth transistor is electrically connected to the data line, and a second electrode of the fifth transistor is electrically connected to the fourth node; a gate electrode of the sixth transistor is electrically connected to the scanning line, a first electrode of the sixth transistor is electrically connected to the second node, and a second electrode of the sixth transistor is electrically connected to the first electrode of the light emitting element; the fifth transistor is an n-type transistor, and the sixth transistor is a p-type transistor; or, the fifth transistor is a p-type transistor, and the sixth transistor is an n-type transistor.

Optionally, the data writing-in circuit includes a fifth transistor, and the third light emitting control circuit includes a sixth transistor; a gate electrode of the fifth transistor is electrically connected to the scanning line, a first electrode of the fifth transistor is electrically connected to the data line, and a second electrode of the fifth transistor is electrically connected to the fourth node; a gate electrode of the sixth transistor is electrically connected to the third light emitting control line, a first electrode of the sixth transistor is electrically connected to the second node, and a second electrode of the sixth transistor is electrically connected to the first electrode of the light emitting element.

Optionally, the third reset circuit includes a seventh transistor; a gate electrode of the seventh transistor is electrically connected to the second reset line, a first electrode of the seventh transistor is electrically connected to the initial voltage terminal, and a second electrode of the seventh transistor is electrically connected to the first electrode of the light emitting element.

In a second aspect, an embodiment of the present disclosure provides a driving method, applied to the display substrate, includes: in at least two rows of pixel circuits included in the plurality of rows of pixel circuits, controlling, by the first light emitting control circuit, the connection between the first node and the fourth node under the control of the first light emitting control signal provided by a same first light emitting control line; and/or, controlling, by the second light emitting control circuit, the connection between the power supply voltage terminal and the first terminal of the driving circuit under the control of the second light emitting control signal provided by a same second light emitting control line; and/or, controlling, by the first reset circuit, the potential of the third node under the control of the first reset signal provided by a same first reset line.

In a third aspect, an embodiment of the present disclosure provides a display device, including the display substrate.

Optionally, the display device further includes a gate driving circuit, wherein the gate driving circuit comprises a plurality of stages of gate driving units; the gate driving circuit is electrically connected to a control signal line, is configured to provide a control signal to the control signal line; one stage of gate driving unit provides a control signal to at least one row of pixel circuits included in the display substrate.

DETAILED DESCRIPTION

Figure 1:
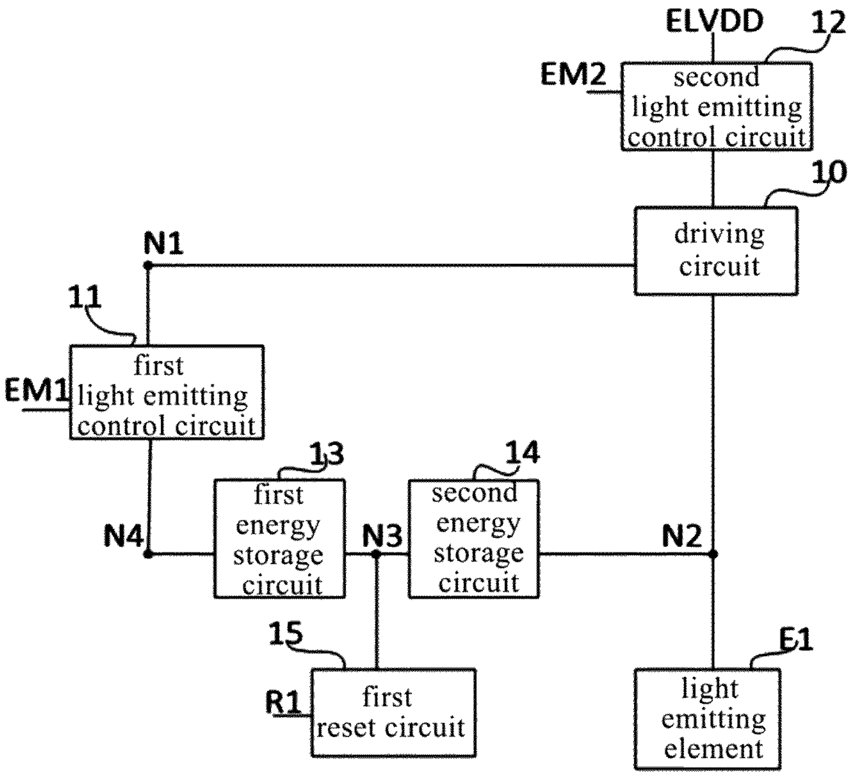
FIG. 1 is a structural diagram of at least one embodiment of a pixel circuit in a display substrate according to an embodiment of the present disclosure.

The technical solutions in the embodiments of the present disclosure will be clearly and completely described below with reference to the accompanying drawings in the embodiments of the present disclosure. Obviously, the described embodiments are only some of the embodiments of the present disclosure, rather than all of the embodiments. Based on the embodiments in the present disclosure, all other embodiments obtained by those of ordinary skill in the art without making creative efforts fall within the scope of protection of the present disclosure.

The transistors used in all embodiments of the present disclosure may be transistors, thin film transistors, field effect transistors, or other devices with the same characteristics. In the embodiment of the present disclosure, in order to distinguish the two electrodes of the transistor except the control electrode, one electrode is called the first electrode and the other electrode is called the second electrode.

In actual operation, when the transistor is a thin film transistor or a field effect transistor, the control electrode may be a gate electrode, the first electrode may be a drain electrode, and the second electrode may be a source electrode; or, the control electrode may be a gate electrode, the first electrode may be a source electrode, and the second electrode may be a drain electrode.

The display substrate according to the embodiment of the present disclosure includes a plurality of rows of pixel circuits; the pixel circuit includes at least one of a first light emitting control circuit, a second light emitting control circuit, and a first reset circuit; the pixel circuit also includes a light emitting element, a driving circuit, a first energy storage circuit, and a second energy storage circuit;

a control terminal of the driving circuit is electrically connected to a first node, a first terminal of the second energy storage circuit is electrically connected to a second node, a second terminal of the second energy storage circuit is electrically connected to a third node, a first terminal of the first energy storage circuit is electrically connected to the third node, and a second terminal of the first energy storage circuit is electrically connected to a fourth node; the first energy storage circuit and the second energy storage circuit are configured to store electrical energy;

The first light emitting control circuit is electrically connected to a first light emitting control line, the first node, and the fourth node, respectively, and is configured to control the connection between the first node and the fourth node under the control of a first light emitting control signal provided by the first light emitting control line;

The second light emitting control circuit is electrically connected to a second light emitting control line, a power supply voltage terminal, and the first terminal of the driving circuit, is configured to control the connection the power supply voltage terminal and the first terminal of the driving circuit under the control of a second light emitting control signal provided by the second light emitting control line;

The first reset circuit is electrically connected to a first reset line and the third node respectively, and is configured to control a potential of the third node under the control of a first reset signal provided by the first reset line;

The second terminal of the driving circuit is electrically connected to the light emitting element, and the driving circuit is configured to generate a driving current to driving the light emitting element under the control of the potential of the first node;

The control signal line includes at least one of the first light emitting control line, the second light emitting control line, and the first reset line;

The control signal lines included in at least two rows of pixel circuits included in the plurality of rows of pixel circuits are electrically connected to each other.

In at least one embodiment of the present disclosure, the control signal lines included in at least two rows of pixel circuits included in the plurality of rows of pixel circuits can be controlled to be electrically connected to each other, that is, at least two rows of pixel circuits are driven by one control signal line to reduce the number of gate driving units.

The display substrate according to the embodiment of the present disclosure includes a plurality of rows of pixel circuits; as shown in FIG. 1, the pixel circuit includes a light emitting element E1, a driving circuit 10, a first light emitting control circuit 11, a second light emitting control circuit 12, a first energy storage circuit 13, a second energy storage circuit 14 and a first reset circuit 15;

The control terminal of the driving circuit 10 is electrically connected to the first node N1;

The first terminal of the second energy storage circuit 14 is electrically connected to the second node N2, and the second terminal of the second energy storage circuit 14 is electrically connected to the third node N3;

The first terminal of the first energy storage circuit 13 is electrically connected to the third node N3, and the second terminal of the first energy storage circuit 13 is electrically connected to the fourth node N4; the first energy storage circuit 13 and the second energy storage circuit 14 are configured to store electrical energy;

The first light emitting control circuit 11 is electrically connected to the first light emitting control line EM1, the first node N1 and the fourth node N4, respectively, and is configured to control the connection between the first node N1 and the fourth node N4 under the control of the first light emitting control signal provided by the first light emitting control line EM1;

The second light emitting control circuit 12 is electrically connected to the second light emitting control line EM2, the power supply voltage terminal ELVDD and the first terminal of the driving circuit 10 respectively, and is configured to control the connection between the power supply voltage terminal ELVDD and the first terminal of the driving circuit 10 under the control of the second light emitting control signal provided by the second light emitting control line EM2;

The first reset circuit 15 is electrically connected to the first reset line R1 and the third node N3 respectively, and is configured to control the potential of the third node N3 under the control of the first reset signal provided by the first reset line R1;

The second terminal of the driving circuit 10 is electrically connected to the light emitting element E1, and the driving circuit 10 is configured to generate a driving current for driving the light emitting element E1 under the control of the potential of the first node N1.

In a driving module including at least one embodiment of the driving circuit shown in FIG. 1, at least two rows of pixel circuits can share at least one of the first light emitting control line EM1, the second light emitting control line EM2, and the first reset line R1;

For example: at least two rows of pixel circuits can share the first light emitting control line EM1, or at least two rows of pixel circuits can share the first light emitting control line EM1 and the second light emitting control line EM2, or at least two rows of pixel circuits can share the first light emitting control line EM1, the second light emitting control line EM2, and the first reset line R1, so as to reduce the number of gate driving units.

In at least one embodiment of the present disclosure, the pixel circuit also includes a second reset circuit;

The second reset circuit is electrically connected to a first reset line and the first node, respectively, is configured to control the potential of the first node under the control of the first reset signal; or, The second reset circuit is electrically connected to the second reset line and the first node, respectively, is configured to control the potential of the first node under the control of the second reset signal provided by the second reset line.

In a specific implementation, the pixel circuit may also include a second reset circuit;

The second reset circuit controls the potential of the first node under the control of the first reset signal or the second reset signal.

Figure 2:
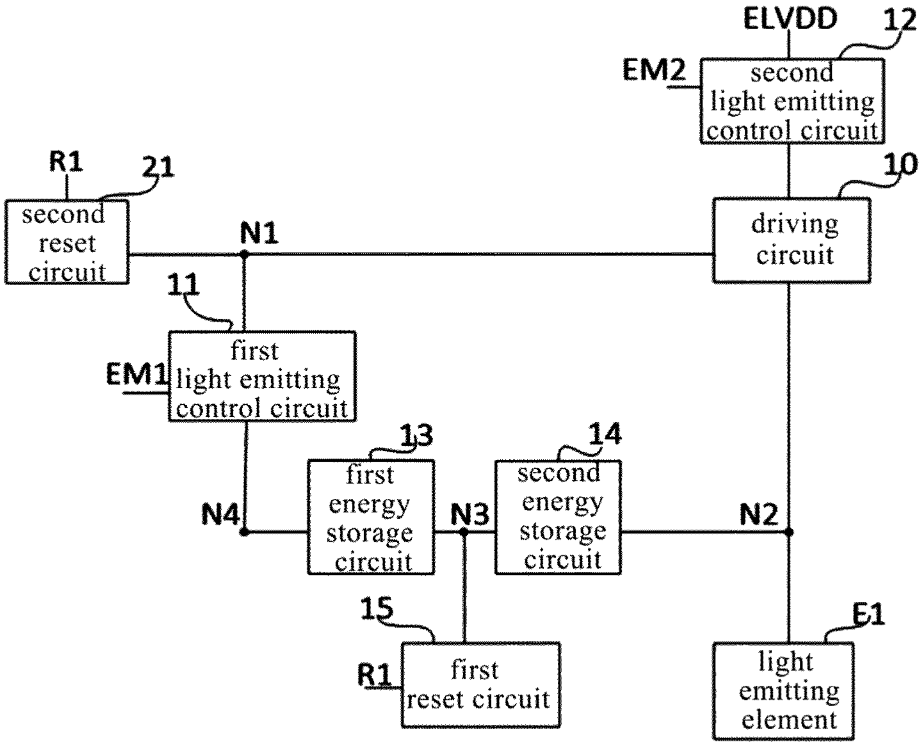
FIG. 2 is a structural diagram of at least one embodiment of a pixel circuit in a display substrate according to an embodiment of the present disclosure.

As shown in FIG. 2, based on the pixel circuit shown in FIG. 1, the pixel circuit further includes a second reset circuit 21;

The second reset circuit 21 is electrically connected to the first reset line R1 and the first node N1 respectively, and is configured to control the potential of the first node under the control of the first reset signal provided by the first reset line R1.

In at least one embodiment of the present disclosure, the first reset circuit is also electrically connected to the reference voltage terminal, and is configured to write the reference voltage into the third node under the control of the first reset signal; the reference voltage terminal is configured to provide the reference voltage; the second reset circuit is also electrically connected to the reference voltage terminal, and is configured to write the reference voltage into the first node under the control of the first reset signal; or, The first reset circuit is also electrically connected to the first node, and is configured to control the connection between the first node and the third node under the control of the first reset signal; the second reset circuit is also electrically connected to the reference voltage terminal, and is configured to write the reference voltage into the first node under the control of the first reset signal; or, The first reset circuit is also electrically connected to the reference voltage terminal, and is configured to write the reference voltage into the third node under the control of the first reset signal; the second reset circuit is also electrically connected to the third node, is configured to control the connection between the first node and the third node under the control of the first reset signal; or, The first reset circuit is also electrically connected to the initial voltage terminal, is configured to write the initial voltage provided by the initial voltage terminal into the third node under the control of the first reset signal; the second reset circuit is also electrically connected to the power supply voltage terminal, is configured to write the power supply voltage provided by the power supply voltage terminal into the first node under the control of the first reset signal.

Figure 3:
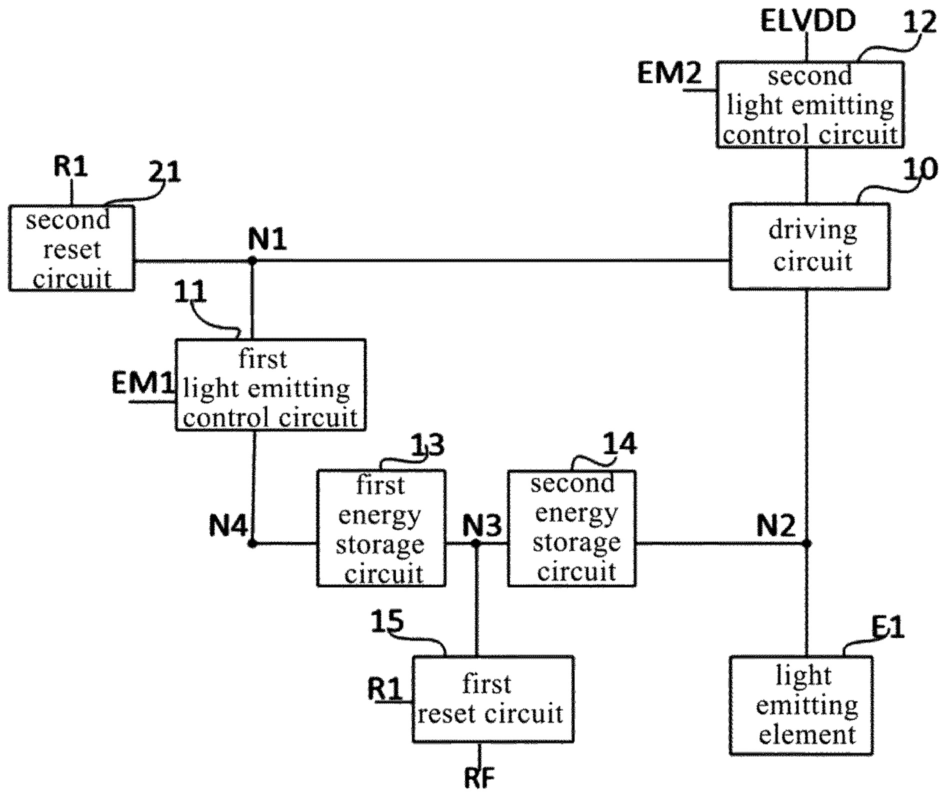
FIG. 3 is a structural diagram of at least one embodiment of a pixel circuit in a display substrate according to an embodiment of the present disclosure.

As shown in FIG. 3, based on the pixel circuit shown in FIG. 2, the first reset circuit 15 is also electrically connected to the reference voltage terminal RF, is configured to write the reference voltage Vref into the third node N3 under the control of the first reset signal;

The reference voltage terminal RF is configured to provide the reference voltage Vref;

The second reset circuit 21 is also electrically connected to the reference voltage terminal RF, is configured to write the reference voltage Vref into the first node N1 under the control of the first reset signal.

Figure 4:
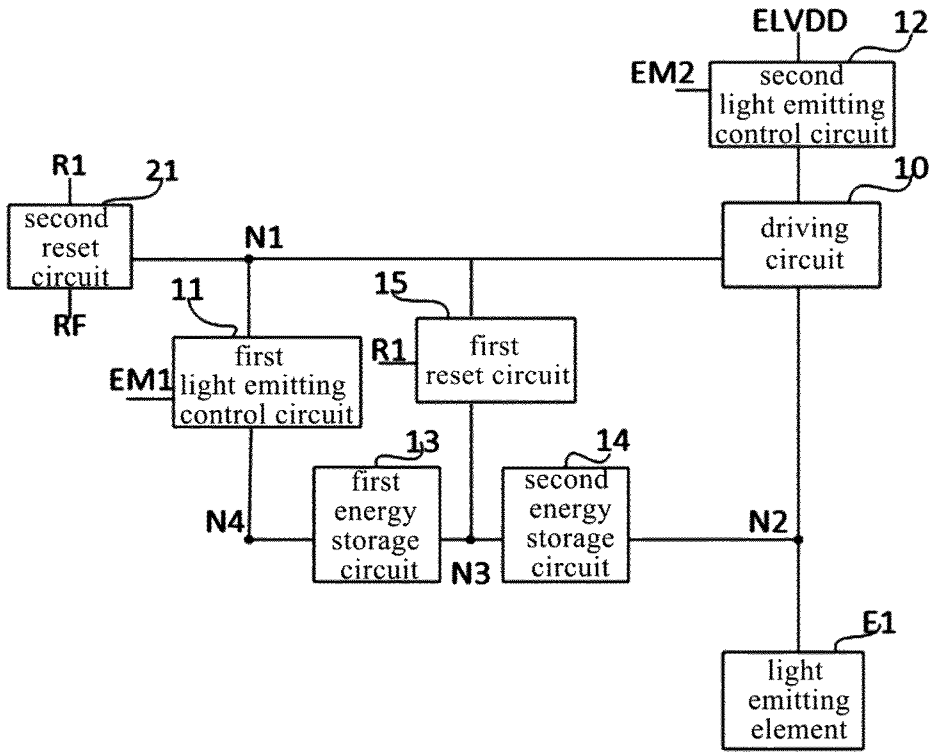
FIG. 4 is a structural diagram of at least one embodiment of a pixel circuit in a display substrate according to an embodiment of the present disclosure.

As shown in FIG. 4, based on the pixel circuit shown in FIG. 2, the first reset circuit 15 is also electrically connected to the first node N1, and is configured to control the connection between the first node N1 and the third node N3 under the control of the first reset signal;

the second reset circuit 21 is also electrically connected to the reference voltage terminal RF, and is configured to write the reference voltage Vref into the first node N1 under the control of the first reset signal.

Figure 5:
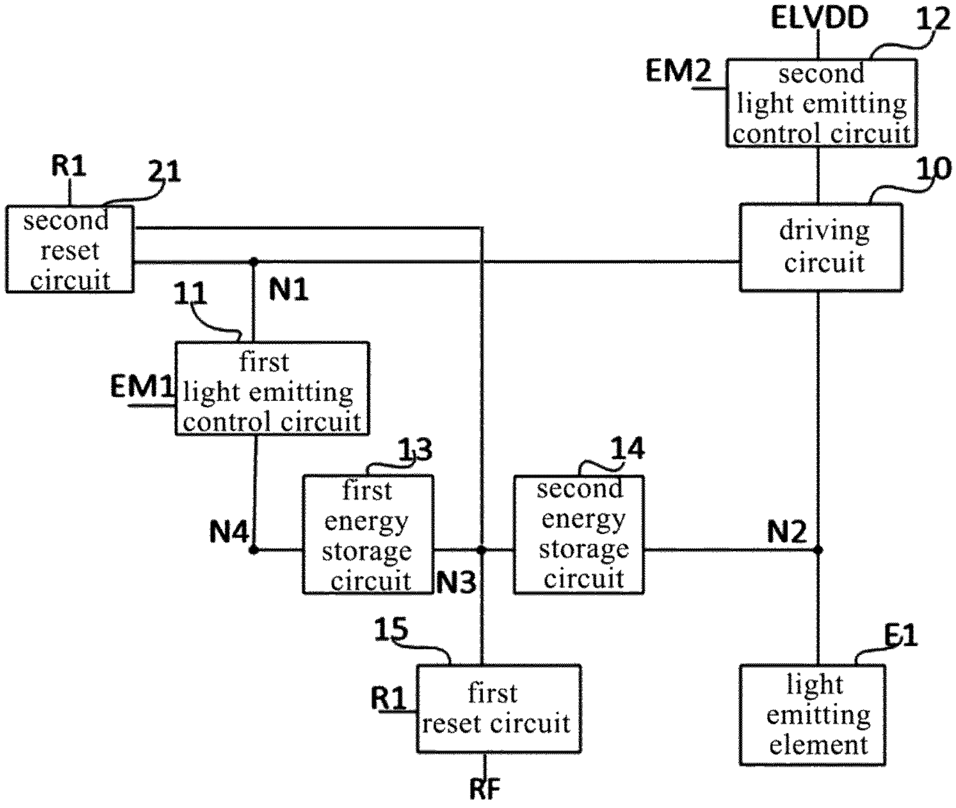
FIG. 5 is a structural diagram of at least one embodiment of a pixel circuit in a display substrate according to an embodiment of the present disclosure.
Figure 6:
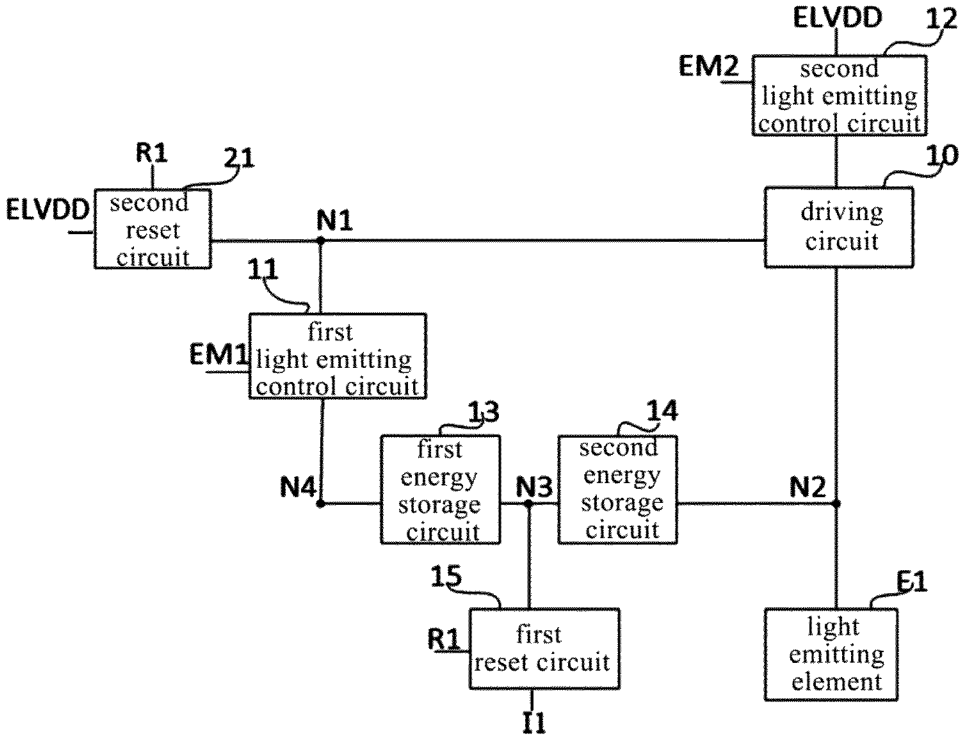
FIG. 6 is a structural diagram of at least one embodiment of a pixel circuit in a display substrate according to an embodiment of the present disclosure.

As shown in FIG. 5, based on the pixel circuit shown in FIG. 2, the first reset circuit 15 is also electrically connected to the reference voltage terminal RF, and is configured to write the reference voltage Vref into the third node N3 under the control of the first reset signal;

the second reset circuit 21 is also electrically connected to the third node N3, and is configured to control the connection between the first node N1 and the third node N3 under the control of the first reset signal;

As shown in FIG. 6, based on the pixel circuit shown in FIG. 2, the first reset circuit 15 is also electrically connected to the initial voltage terminal I1, and is configured to write the initial voltage Vint provided by the initial voltage terminal I1 into the third node N3 under the control of the first reset signal;

the second reset circuit 21 is also electrically connected to the power supply voltage terminal ELVDD, and is configured to write the power supply voltage Vdd provided by the power supply voltage terminal ELVDD into the first node N1 under the control of the first reset signal.

In the display substrate according to at least one embodiment of the present disclosure, the pixel circuit further includes a data writing-in circuit;

The data writing-in circuit is electrically connected to the scanning line, the data line and the fourth node respectively, and is configured to write the data voltage provided by the data line into the fourth node under the control of the scanning signal provided by the scanning line.

In specific implementation, the display substrate according to at least one embodiment of the present disclosure may also include a data writing-in circuit, and the data writing-in circuit writes the data voltage into the fourth node under the control of the scanning signal.

Figure 7:
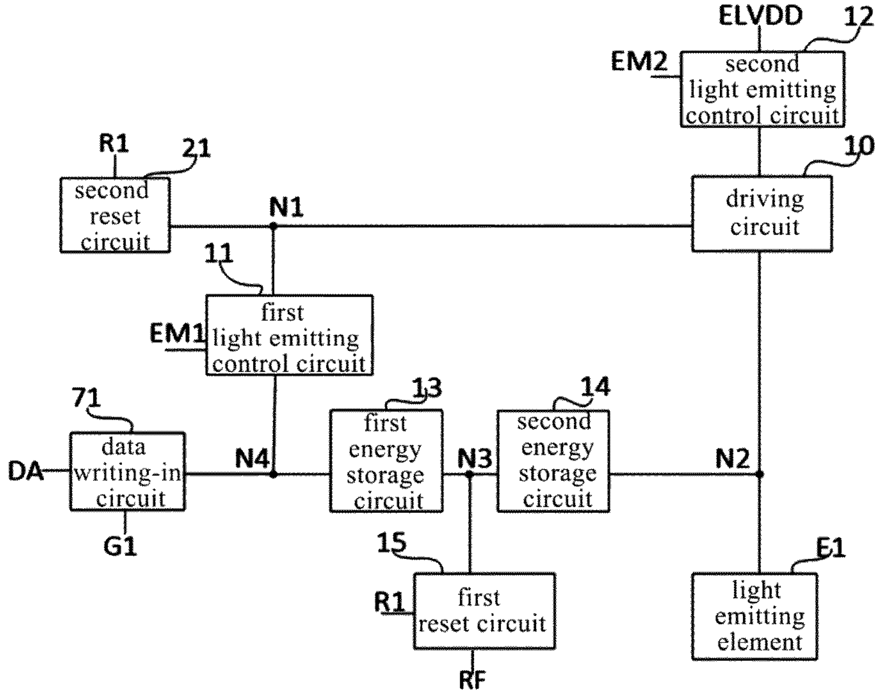
FIG. 7 is a structural diagram of at least one embodiment of a pixel circuit in a display substrate according to an embodiment of the present disclosure.

As shown in FIG. 7, based on the pixel circuit shown in FIG. 3, the pixel circuit further includes a data writing-in circuit 71;

The data writing-in circuit 71 is electrically connected to the scanning line G1, the data line DA and the fourth node N4 respectively, and is configured to write the data voltage Vdata provided by the data line DA into the fourth node N4 under the control of the scanning signal provided by the scanning line G1.

Figure 8:
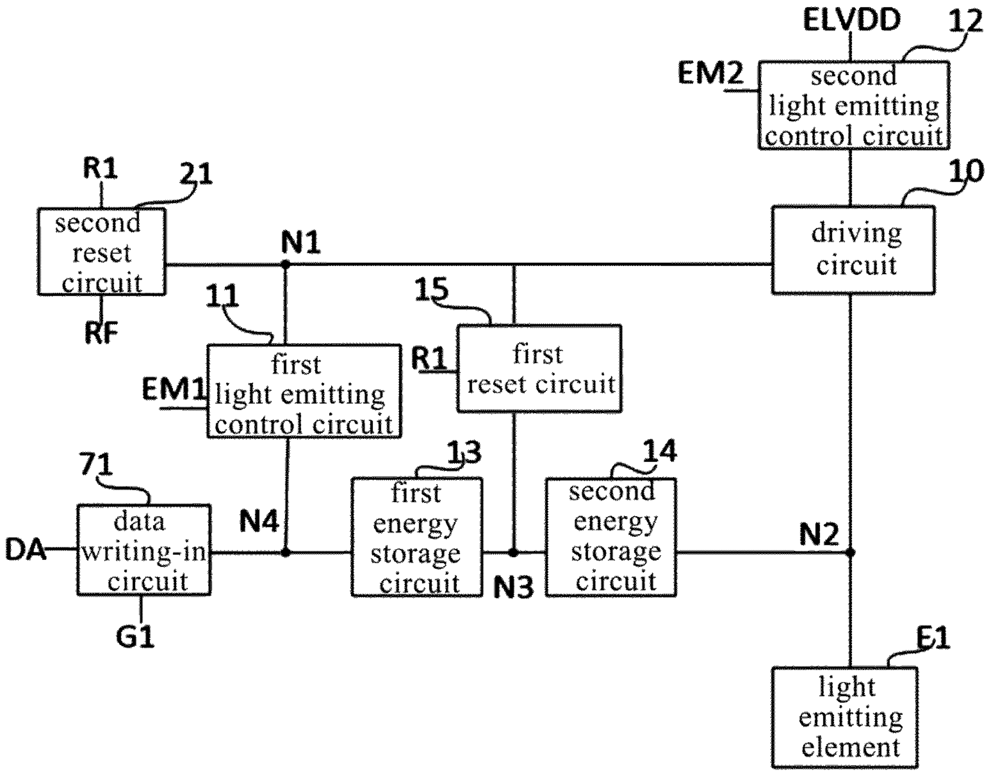
FIG. 8 is a structural diagram of at least one embodiment of a pixel circuit in a display substrate according to an embodiment of the present disclosure.

As shown in FIG. 8, based on the pixel circuit shown in FIG. 4, the pixel circuit further includes a data writing-in circuit 71;

The data writing-in circuit 71 is electrically connected to the scanning line G1, the data line DA and the fourth node N4, respectively, and is configured to write the data voltage Vdata provided by the data line DA into the fourth node N4 under the control of the scanning signal provided by the scanning line G1.

Figure 9:
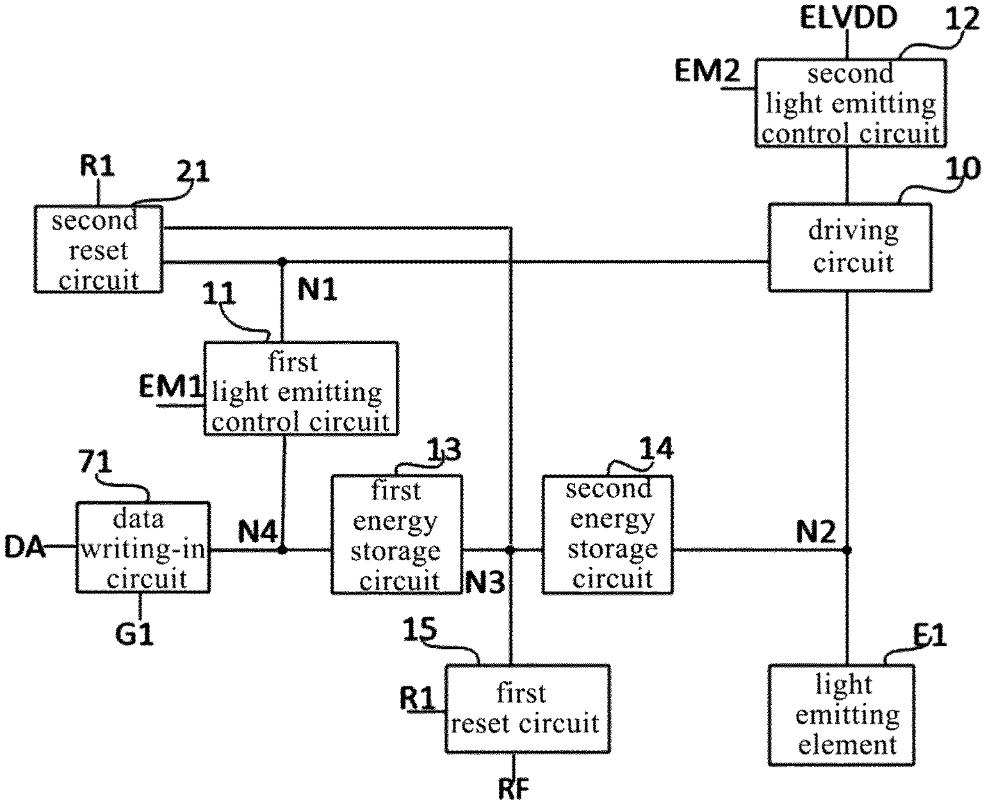
FIG. 9 is a structural diagram of at least one embodiment of a pixel circuit in a display substrate according to an embodiment of the present disclosure.

As shown in FIG. 9, based on the pixel circuit shown in FIG. 5, the pixel circuit further includes a data writing-in circuit 71;

The data writing-in circuit 71 is electrically connected to the scanning line G1, the data line DA and the fourth node N4, respectively, and is configured to write the data voltage Vdata provided by the data line DA into the fourth node N4 under the control of the scanning signal provided by the scanning line G1.

Figure 10:
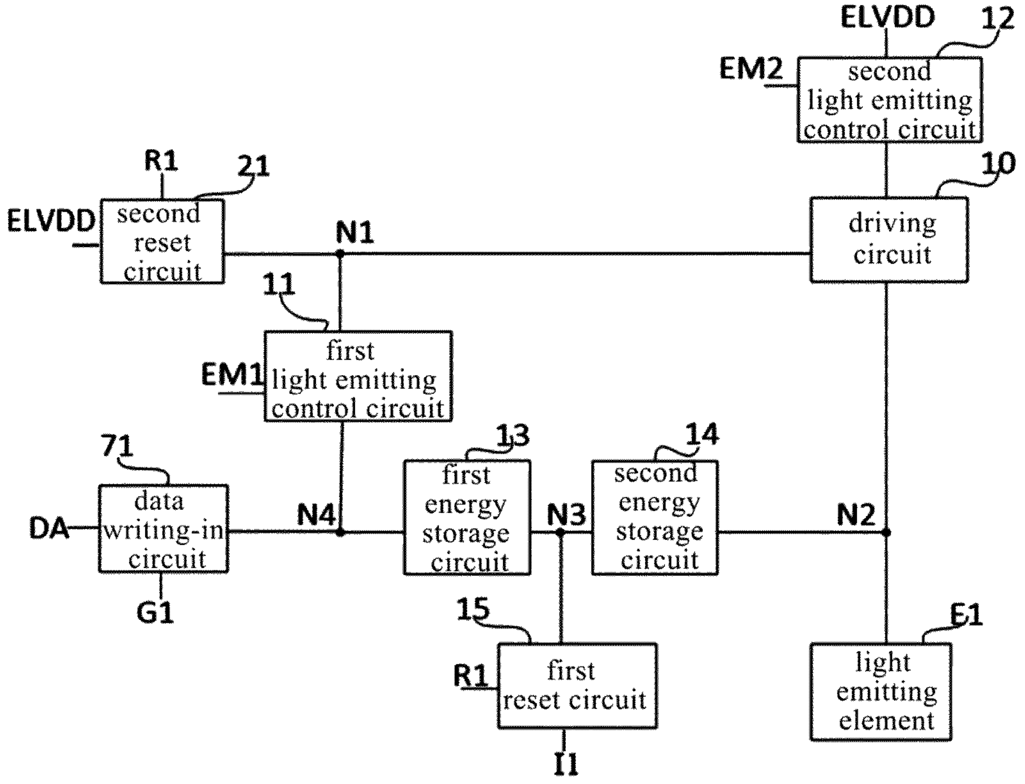
FIG. 10 is a structural diagram of at least one embodiment of a pixel circuit in a display substrate according to an embodiment of the present disclosure.

As shown in FIG. 10, based on the pixel circuit shown in FIG. 6, the pixel circuit further includes a data writing-in circuit 71;

The data writing-in circuit 71 is electrically connected to the scanning line G1, the data line DA and the fourth node N4 respectively, and is configured to write the data voltage Vdata provided by the data line DA into the fourth node N4 under the control of the scanning signal provided by the scanning line G1.

In the display substrate according to at least one embodiment of the present disclosure, the pixel circuit further includes a third light emitting control circuit;

The third light emitting control circuit is electrically connected to the scanning line, the second node and the first electrode of the light emitting element respectively, and is configured to control the connection between the second node and the first electrode of the light emitting element under the control of the scanning signal provided by the scanning line;

The second electrode of the light emitting element is electrically connected to the first voltage terminal.

In specific implementation, the pixel circuit may also include a third light emitting control circuit, and the third light emitting control circuit controls the connection between the second node and the first electrode of the light emitting element under the control of the scanning signal.

Optionally, in the display substrate according to at least one embodiment of the present disclosure, the pixel circuit further includes a third light emitting control circuit;

The third light emitting control circuit is electrically connected to the third light emitting control line, the second node and the first electrode of the light emitting element respectively, and is configured to control the connection between the second node and the first electrode of the light emitting element under the control of the third light emitting control signal provided by the third light emitting control line;

The second electrode of the light emitting element is electrically connected to the first voltage terminal.

In a specific implementation, the display substrate may further include a third light emitting control circuit, and the third light emitting control circuit controls the connection between the second node and the first electrode of the light emitting element under the control of the third light emitting control signal.

Optionally, the first voltage terminal may be a low voltage, but is not limited thereto.

Figure 11:
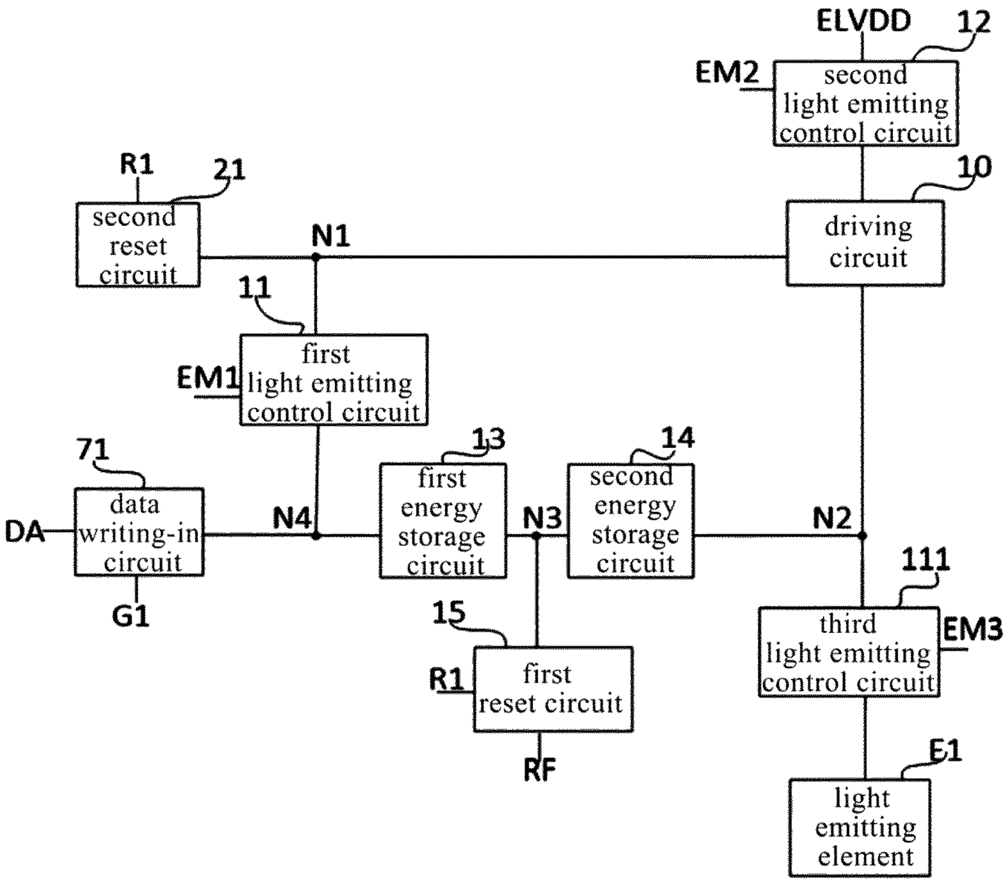
FIG. 11 is a structural diagram of at least one embodiment of a pixel circuit in a display substrate according to an embodiment of the present disclosure. Structural diagram.

As shown in FIG. 11, based on the pixel circuit shown in FIG. 7, the pixel circuit further includes a third light emitting control circuit 111;

The third light emitting control circuit 111 is electrically connected to the third light emitting control line EM3, the second node N2 and the first electrode of the light emitting element E1, respectively, and is configured to control the second node N2 to be connected to the first electrode of the light emitting element E1 under the control of the third light emitting control signal provided by the third light emitting control line EM3;

The first electrode of the light emitting element E1 is electrically connected to the first voltage terminal V1.

Figure 12:
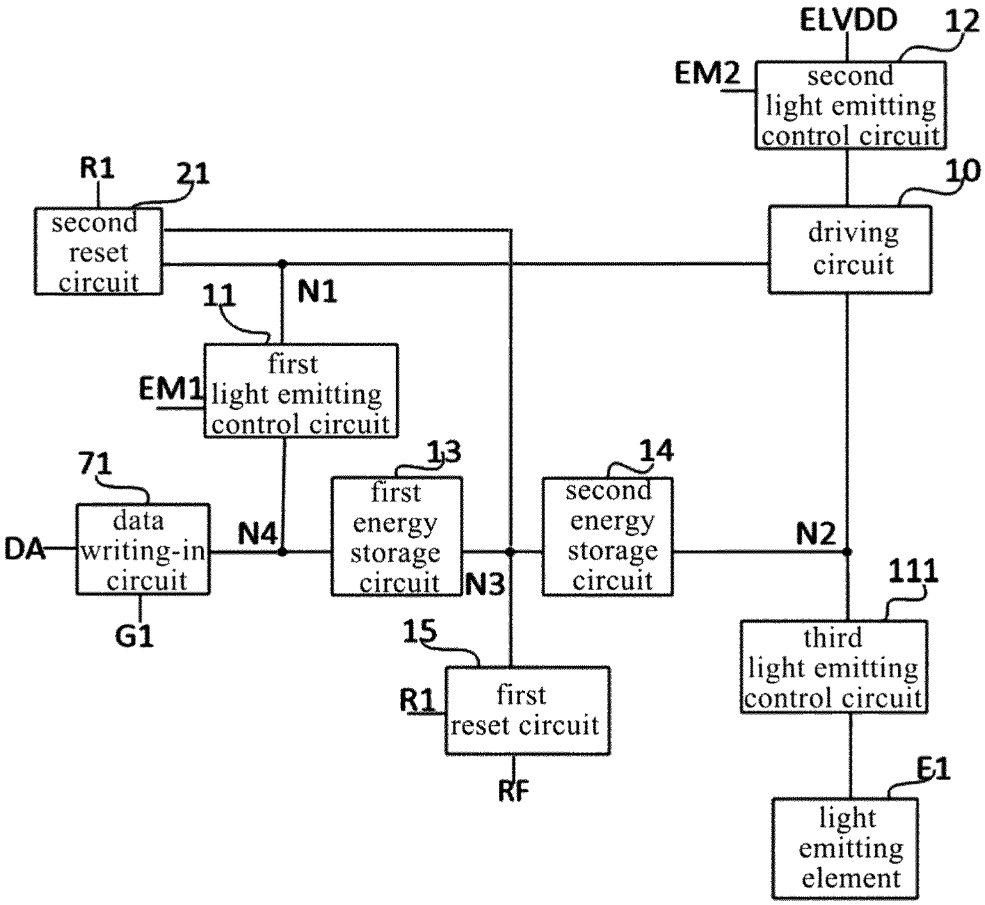
FIG. 12 is a structural diagram of the pixel circuit in the display substrate according to the embodiment of the present disclosure.

As shown in FIG. 12, based on the pixel circuit shown in FIG. 8, the pixel circuit further includes a third light emitting control circuit 111;

The third light emitting control circuit 111 is electrically connected to the third light emitting control line EM3, the second node N2 and the first electrode of the light emitting element E1, respectively, and is configured to control the second node N2 to be connected to the first electrode of the light emitting element E1 under the control of the third light emitting control signal provided by the third light emitting control line EM3;

The first electrode of the light emitting element E1 is electrically connected to the first voltage terminal V1.

Figure 13:
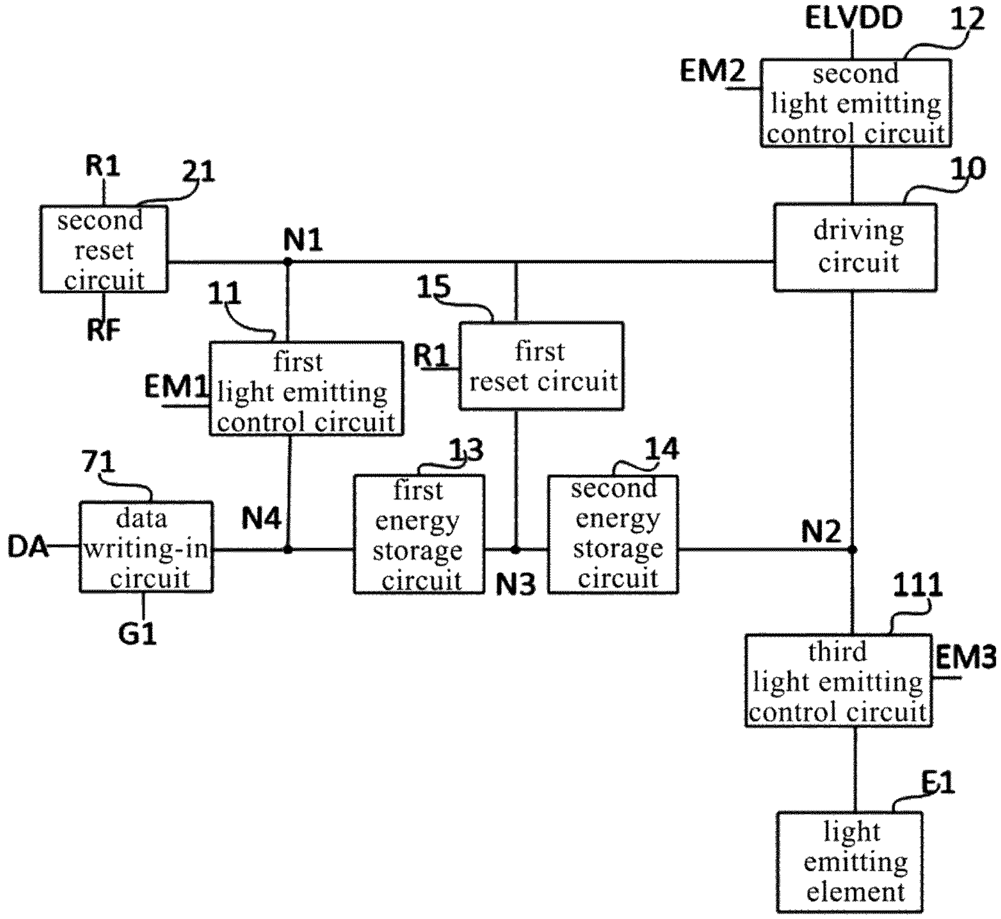
FIG. 13 is a structural diagram of the pixel circuit in the display substrate according to the embodiment of the present disclosure.

As shown in FIG. 13, based on the pixel circuit shown in FIG. 9, the pixel circuit further includes a third light emitting control circuit 111;

The third light emitting control circuit 111 is electrically connected to the third light emitting control line EM3, the second node N2 and the first electrode of the light emitting element E1 respectively, and is configured to control the connection between the second node N2 and the first electrode of the light emitting element E1 under the control of the third light emitting control signal provided by the third light emitting control line EM3;

The first electrode of the light emitting element E1 is electrically connected to the first voltage terminal V1.

Figure 14:
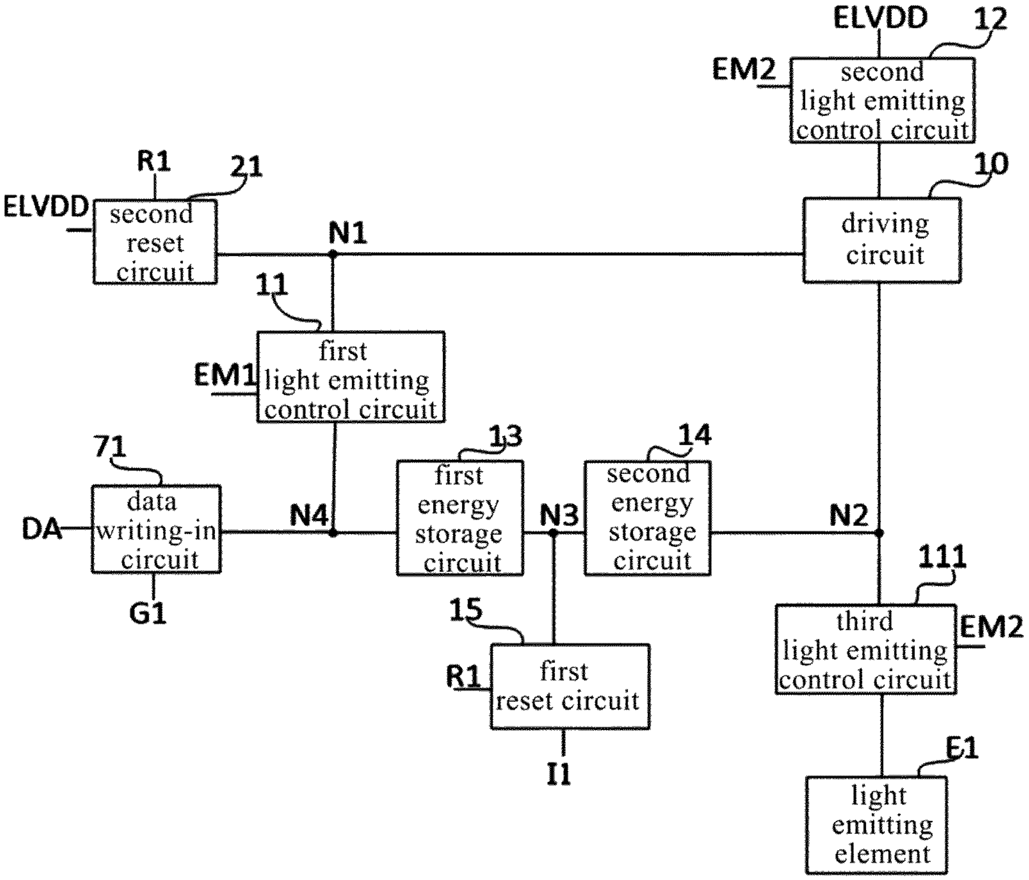
FIG. 14 is a structural diagram of the pixel circuit in the display substrate according to the embodiment of the present disclosure.

As shown in FIG. 14, based on the pixel circuit shown in FIG. 10, the pixel circuit further includes a third light emitting control circuit 111;

The third light emitting control circuit 111 is electrically connected to the third light emitting control line EM3, the second node N2 and the first electrode of the light emitting element E1, respectively, and is configured to control the connection between the second node N2 and the first electrode of the light emitting element E1 under the control of the third light emitting control signal provided by the third light emitting control line EM3;

The first electrode of the light emitting element E1 is electrically connected to the first voltage terminal V1.

In the display substrate according to at least one embodiment of the present disclosure, the pixel circuit further includes a third reset circuit;

The third reset circuit is electrically connected to a second reset line, an initial voltage terminal and the first electrode of the light emitting element, respectively, and is configured to write an initial voltage provided by the initial voltage terminal into the first electrode of the light emitting element under the control of a second reset signal provided by the second reset line.

In specific implementation, the pixel circuit may further include a third reset circuit; the third reset circuit writes the initial voltage into the first electrode of the light emitting element under the control of the second reset signal.

Figure 15:
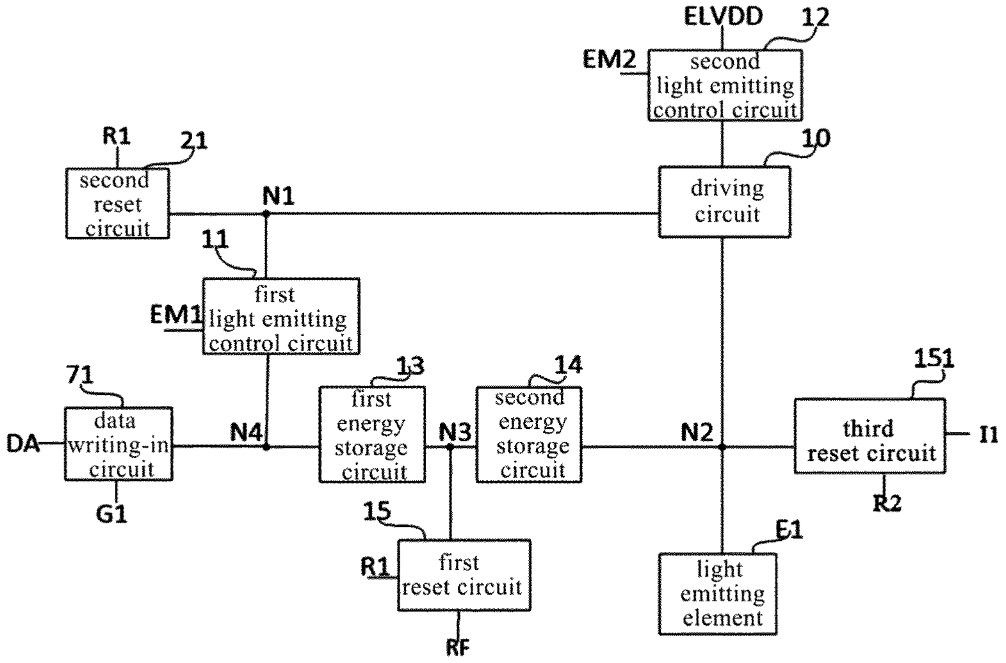
FIG. 15 is a structural diagram of the pixel circuit in the display substrate according to the embodiment of the present disclosure.

As shown in FIG. 15, based on the pixel circuit shown in FIG. 7, the pixel circuit further includes a third reset circuit 151;

The third reset circuit 151 is electrically connected to the second reset line R2, the initial voltage terminal I1 and the first electrode of the light emitting element E1, respectively, and is configured to write the initial voltage Vint provided by the initial voltage terminal I1 into the first electrode of the light emitting element E1 under the control of the second reset signal provided by the second reset line R2.

Figure 16:
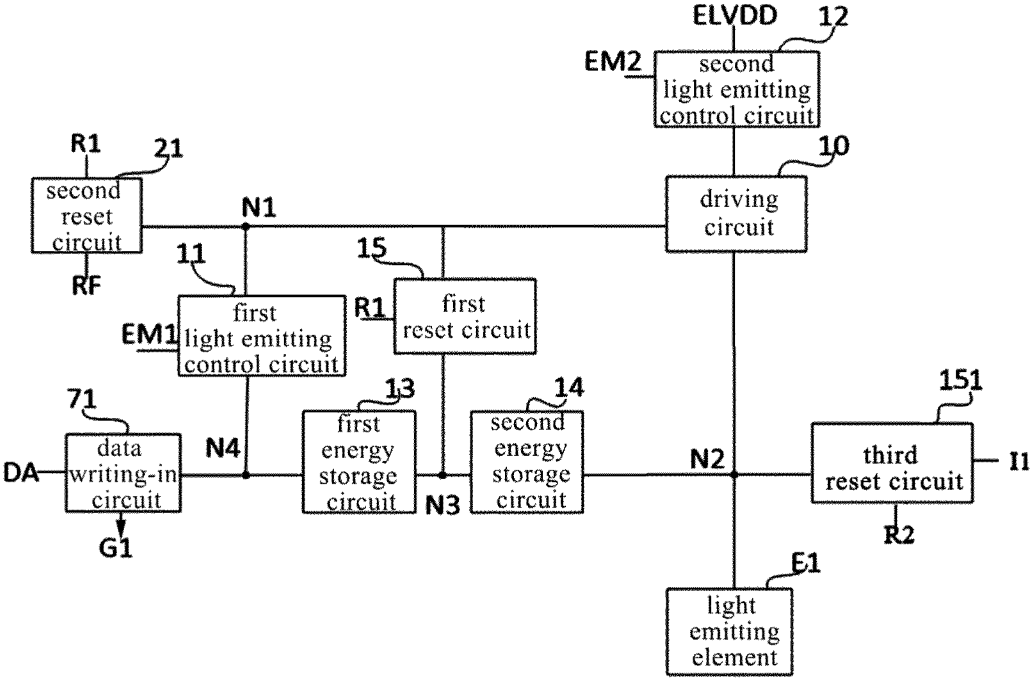
FIG. 16 is a structural diagram of the pixel circuit in the display substrate according to the embodiment of the present disclosure.

As shown in FIG. 16, based on the pixel circuit shown in FIG. 8, the pixel circuit further includes a third reset circuit 151;

The third reset circuit 151 is electrically connected to the second reset line R2, the initial voltage terminal I1 and the first electrode of the light emitting element E1, respectively, and is configured to write the initial voltage Vint provided by the initial voltage terminal I1 into the first electrode of the light emitting element E1 under the control of the second reset signal provided by the second reset line R2.

Figure 17:
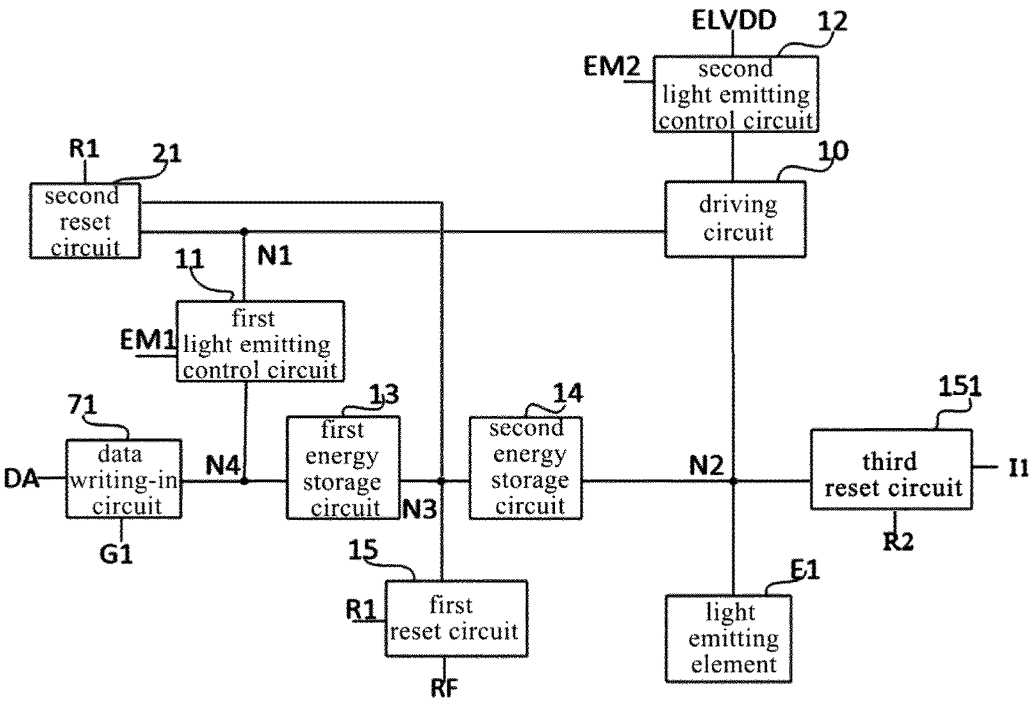
FIG. 17 is a structural diagram of the pixel circuit in the display substrate according to the embodiment of the present disclosure.

As shown in FIG. 17, based on the pixel circuit shown in FIG. 9, the pixel circuit further includes a third reset circuit 151;

The third reset circuit 151 is electrically connected to the second reset line R2, the initial voltage terminal I1 and the first electrode of the light emitting element E1, respectively, and is configured to write the initial voltage Vint provided by the initial voltage terminal I1 into the first electrode of the light emitting element E1 under the control of the second reset signal provided by the second reset line R2.

Figure 18:
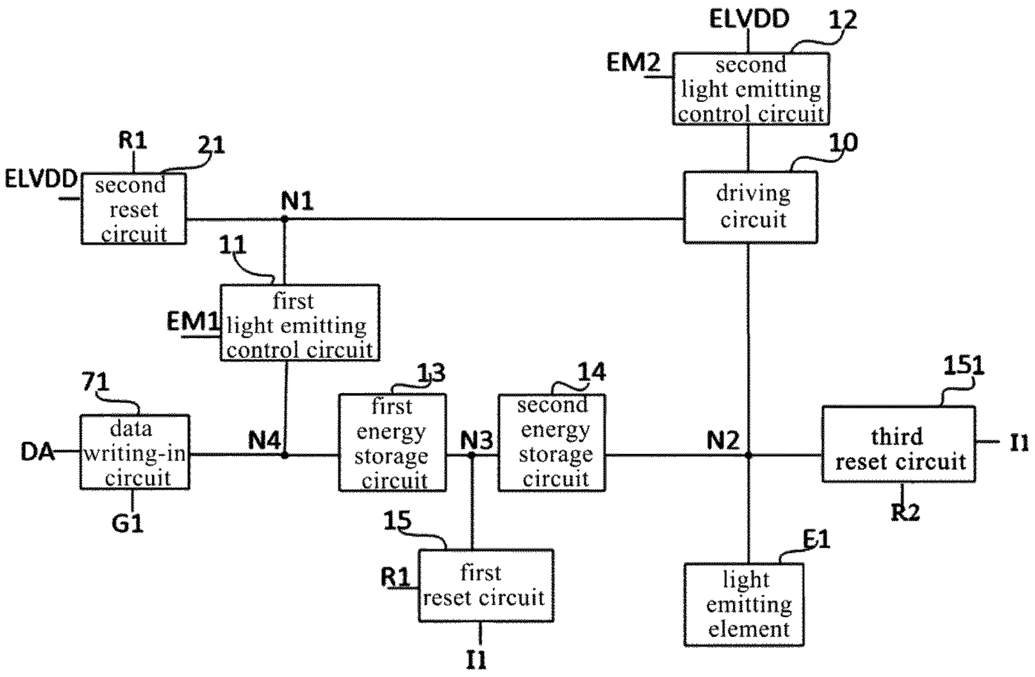
FIG. 18 is a structural diagram of the pixel circuit in the display substrate according to the embodiment of the present disclosure.

As shown in FIG. 18, based on the pixel circuit shown in FIG. 10, the pixel circuit further includes a third reset circuit 151;

The third reset circuit 151 is electrically connected to the second reset line R2, the initial voltage terminal I1 and the first electrode of the light emitting element E1, respectively, and is configured to write the initial voltage Vint provided by the initial voltage terminal I1 into the first electrode of the light emitting element E1 under the control of the second reset signal provided by the second reset line R2.

Figure 19:
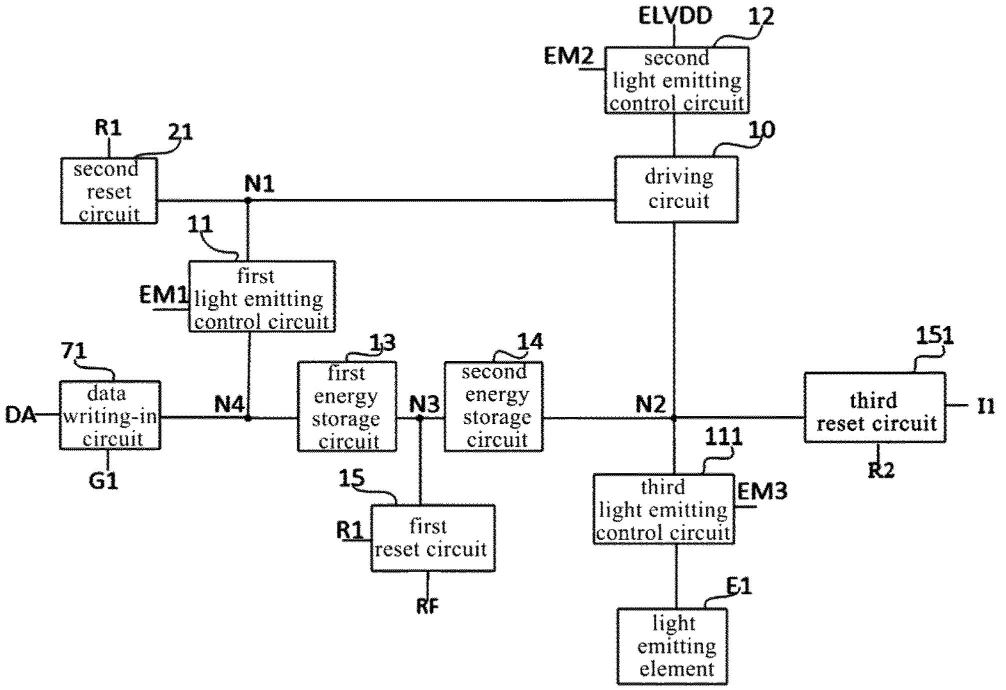
FIG. 19 is a structural diagram of the pixel circuit in the display substrate according to the embodiment of the present disclosure.

As shown in FIG. 19, based on the pixel circuit shown in FIG. 11, the pixel circuit further includes a third reset circuit 151;

The third reset circuit 151 is electrically connected to the second reset line R2, the initial voltage terminal I1 and the first electrode of the light emitting element E1, respectively, and is configured to write the initial voltage Vint provided by the initial voltage terminal I1 into the first electrode of the light emitting element E1 under the control of the second reset signal provided by the second reset line R2.

Figure 20:
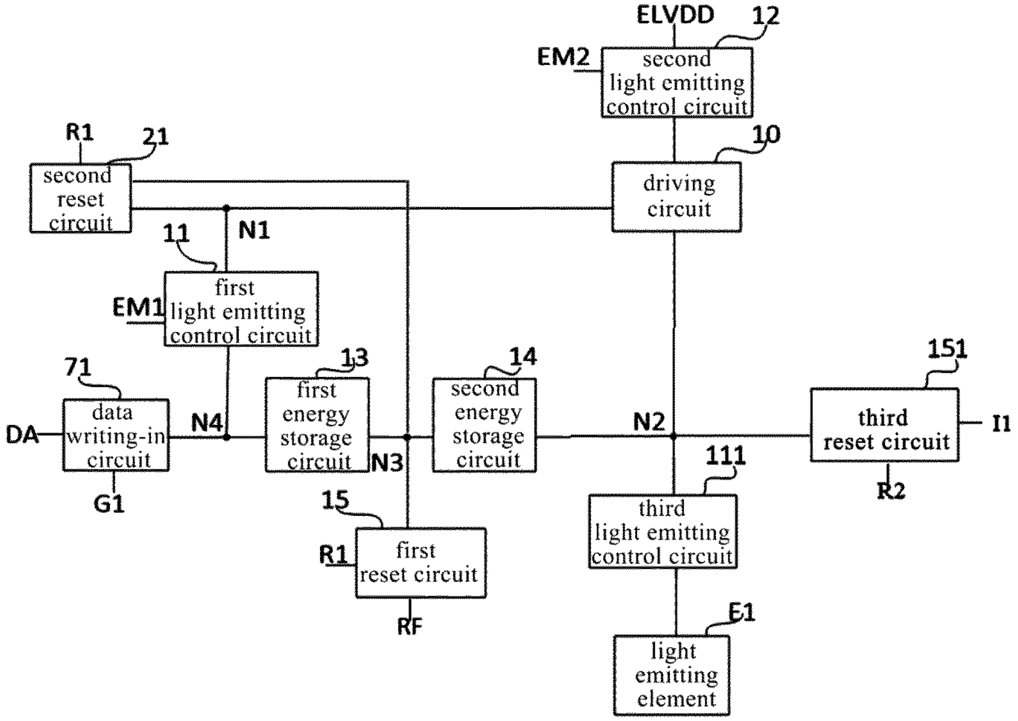
FIG. 20 is a structural diagram of the pixel circuit in the display substrate according to the embodiment of the present disclosure.

As shown in FIG. 20, based on the pixel circuit shown in FIG. 12, the pixel circuit further includes a third reset circuit 151;

The third reset circuit 151 is electrically connected to the second reset line R2, the initial voltage terminal I1 and the first electrode of the light emitting element E1, respectively, and is configured to write the initial voltage Vint provided by the initial voltage terminal I1 into the first electrode of the light emitting element E1 under the control of the second reset signal provided by the second reset line R2.

Figure 21:
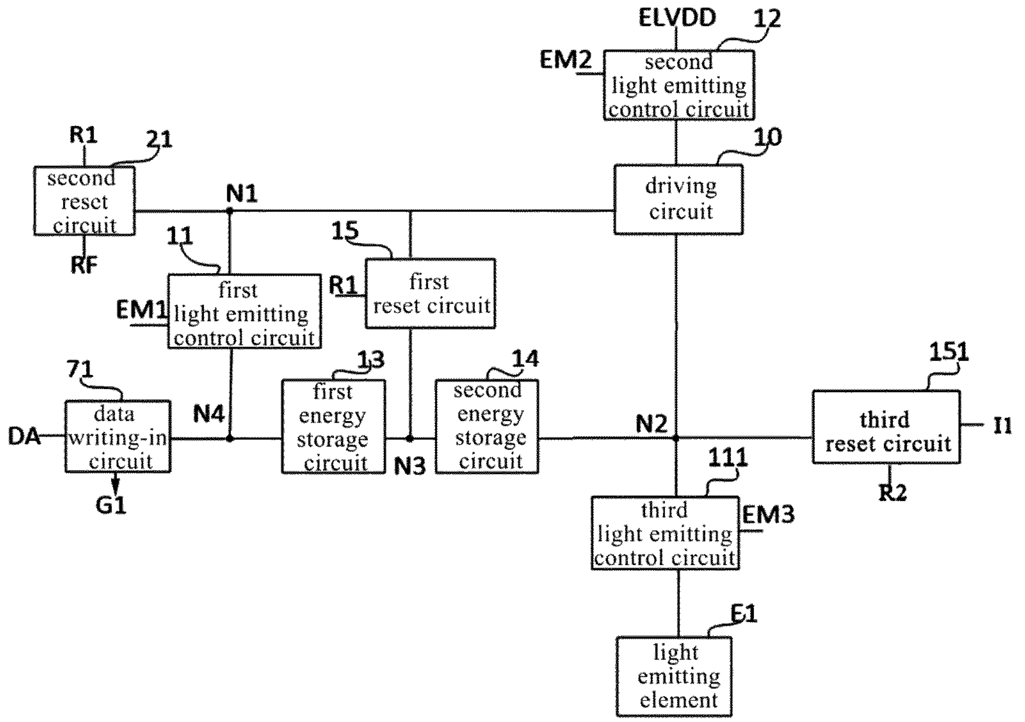
FIG. 21 is a structural diagram of the pixel circuit in the display substrate according to the embodiment of the present disclosure.

As shown in FIG. 21, based on the pixel circuit shown in FIG. 13, the pixel circuit further includes a third reset circuit 151;

The third reset circuit 151 is electrically connected to the second reset line R2, the initial voltage terminal I1 and the first electrode of the light emitting element E1, respectively, and is configured to write the initial voltage Vint provided by the initial voltage terminal I1 into the first electrode of the light emitting element E1 under the control of the second reset signal provided by the second reset line R2.

Figure 22:
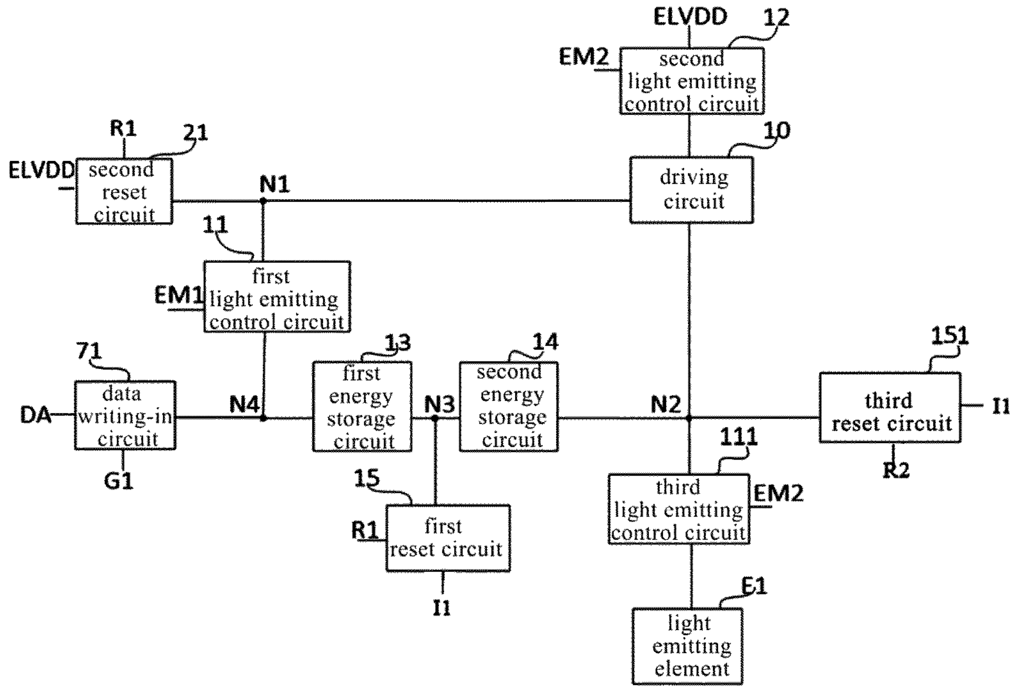
FIG. 22 is a structural diagram of the display substrate according to the embodiment of the present disclosure.

As shown in FIG. 22, based on the pixel circuit shown in FIG. 14, the pixel circuit further includes a third reset circuit 151;

The third reset circuit 151 is electrically connected to the second reset line R2, the initial voltage terminal I1 and the first electrode of the light emitting element E1, respectively, and is configured to write the initial voltage Vint provided by the initial voltage terminal I1 into the first electrode of the light emitting element E1 under the control of the second reset signal provided by the second reset line R2.

Optionally, the first light emitting control circuit includes a first transistor, and the second light emitting control circuit includes a second transistor;

a gate electrode of the first transistor is electrically connected to the first light emitting control line, a first electrode of the first transistor is electrically connected to the first node, and a second electrode of the first transistor is electrically connected to the fourth node;

a gate electrode of the second transistor is electrically connected to the second light emitting control line, a first electrode of the second transistor is electrically connected to the power supply voltage terminal, and a second electrode of the second transistor is electrically connected to the first terminal of the driving circuit.

In at least one embodiment of the present disclosure, in at least two adjacent rows of pixel circuits included in the plurality of rows of pixel circuit, first light emitting control lines electrically connected to the first transistor are electrically connected to each other; and/or, second light emitting control lines electrically connected to the second transistor are electrically connected to each other.

Optionally, the driving circuit includes a driving transistor, the first energy storage circuit includes a first capacitor, and the second energy storage circuit includes a second capacitor;

a first terminal of the first capacitor is electrically connected to the third node, and a second terminal of the first capacitor is electrically connected to the fourth node;

a first terminal of the second capacitor is electrically connected to the second node, and a second terminal of the second capacitor is electrically connected to the third node;

a gate electrode of the driving transistor is electrically connected to a control terminal of the driving circuit, a first electrode of the driving transistor is electrically connected to a first terminal of the driving circuit, and a second electrode of the driving transistor is electrically connected to a second terminal of the driving circuit.

Optionally, the first reset circuit includes a third transistor, and the second reset circuit includes a fourth transistor;

a gate electrode of the third transistor is electrically connected to the first reset line, a first electrode of the third transistor is electrically connected to the reference voltage terminal or the initial voltage terminal, and a second electrode of the third transistor is electrically connected to the third node; a gate electrode of the fourth transistor is electrically connected to the first reset line, a first electrode of the fourth transistor is electrically connected to the reference voltage terminal or the power supply voltage terminal, and a second electrode of the fourth transistor is electrically connected to the first node.

Optionally, the first reset circuit includes a third transistor, and the second reset circuit includes a fourth transistor;

a gate electrode of the third transistor is electrically connected to the first reset line, a first electrode of the third transistor is electrically connected to the first node, and a second electrode of the third transistor is electrically connected to the third node; a gate electrode of the fourth transistor is electrically connected to the first reset line, a first electrode of the fourth transistor is electrically connected to the reference voltage terminal, and a second electrode of the fourth transistor is electrically connected to the first node.

Optionally, the first reset circuit includes a third transistor, and the second reset circuit includes a fourth transistor;

a gate electrode of the third transistor is electrically connected to the first reset line, a first electrode of the third transistor is electrically connected to the reference voltage terminal, and a second electrode of the third transistor is electrically connected to the third node; a gate electrode of the fourth transistor is electrically connected to the first reset line, a first electrode of the fourth transistor is electrically connected to the third node, and a second electrode of the fourth transistor is electrically connected to the first node.

In at least one embodiment of the present disclosure, in at least two adjacent rows of pixel circuits included in the plurality of rows of pixel circuit, first reset lines electrically connected to the third transistor are electrically connected to each other; and/or, first reset lines electrically connected to the fourth transistor are electrically connected to each other.

Optionally, the data writing-in circuit includes a fifth transistor, and the third light emitting control circuit includes a sixth transistor;

a gate electrode of the fifth transistor is electrically connected to the scanning line, a first electrode of the fifth transistor is electrically connected to the data line, and a second electrode of the fifth transistor is electrically connected to the fourth node;

a gate electrode of the sixth transistor is electrically connected to the scanning line, a first electrode of the sixth transistor is electrically connected to the second node, and a second electrode of the sixth transistor is electrically connected to the first electrode of the light emitting element;

The fifth transistor is an n-type transistor, and the sixth transistor is a p-type transistor; or, the fifth transistor is a p-type transistor, and the sixth transistor is an n-type transistor.

Optionally, the data writing-in circuit includes a fifth transistor, and the third light emitting control circuit includes a sixth transistor;

a gate electrode of the fifth transistor is electrically connected to the scanning line, a first electrode of the fifth transistor is electrically connected to the data line, and a second electrode of the fifth transistor is electrically connected to the fourth node;

a gate electrode of the sixth transistor is electrically connected to the third light emitting control line, a first electrode of the sixth transistor is electrically connected to the second node, and a second electrode of the sixth transistor is electrically connected to the first electrode of the light emitting element.

Optionally, the third reset circuit includes a seventh transistor;

a gate electrode of the seventh transistor is electrically connected to the second reset line, a first electrode of the seventh transistor is electrically connected to the initial voltage terminal, and a second electrode of the seventh transistor is electrically connected to the first electrode of the light emitting element.

Optionally, the first transistor, the second transistor, the third transistor, the fourth transistor, the fifth transistor, the sixth transistor and the seventh transistor can all be n-type transistors, and the n-type transistor can be an oxide transistor; for example, the oxide transistor can be an Indium Gallium Zinc (IGZO) transistor.

Optionally, the first transistor, the second transistor, the third transistor, the fourth transistor, the fifth transistor and the seventh transistor can all be n-type transistors, and the sixth transistor can be a p-type transistor; the n-type transistor can be an oxide transistor, and the p-type transistor can be a low-temperature polysilicon transistor; for example, the oxide transistor can be an IGZO transistor, and the semiconductor material of the p-type transistor can be made of amorphous silicon (a-Si) or polysilicon.

Figure 23:
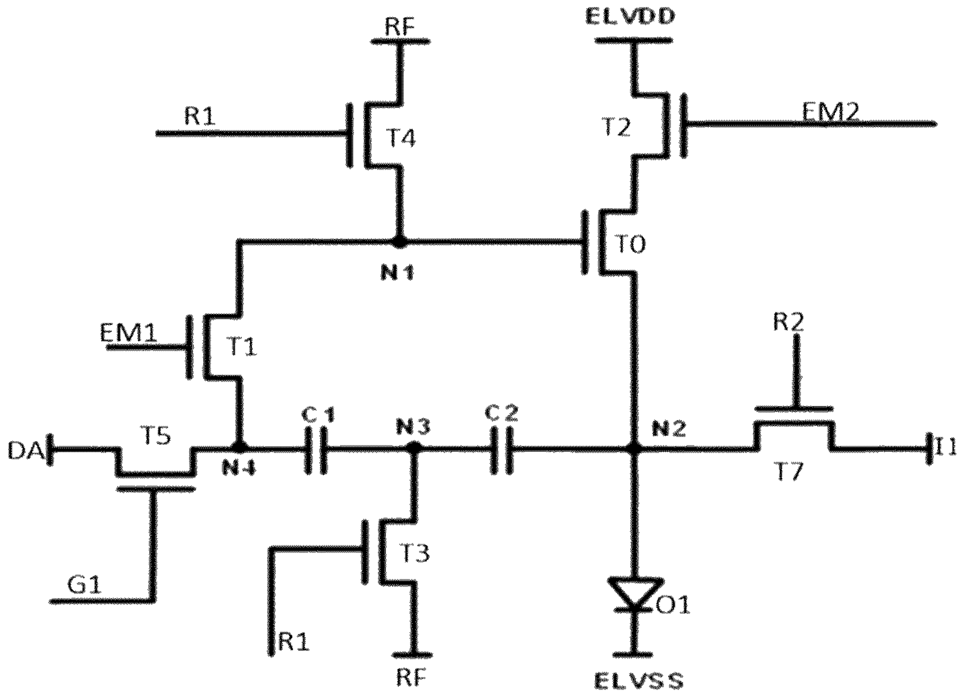
FIG. 23 is a circuit diagram of the pixel circuit in the display substrate according to the embodiment of the present disclosure.

As shown in FIG. 23, based on the pixel circuit shown in FIG. 15, the first light emitting control circuit includes a first transistor T1, and the second light emitting control circuit includes a second transistor T2; the driving circuit includes a driving transistor TO;

the gate electrode of the first transistor T1 is electrically connected to the first light emitting control line EM1, the source electrode of the first transistor T1 is electrically connected to the first node N1, and the drain electrode of the first transistor T1 is electrically connected to the fourth node N4;

the gate electrode of the second transistor T2 is electrically connected to the second light emitting control line EM2, the source electrode of the second transistor T2 is electrically connected to the power supply voltage terminal ELVDD, and the drain electrode of the second transistor T2 is electrically connected to the source electrode of the driving transistor TO;

the first energy storage circuit includes a first capacitor C1, and the second energy storage circuit includes a second capacitor C2;

the first terminal of the first capacitor C1 is electrically connected to the third node N3, and the second terminal of the first capacitor is electrically connected to the fourth node N4;

the first terminal of the second capacitor C2 is electrically connected to the second node N2, and the second terminal of the second capacitor is electrically connected to the third node N3;

the first reset circuit includes a third transistor T3, the second reset circuit includes a fourth transistor T4;

The gate electrode of the third transistor T3 is electrically connected to the first reset line R1, the source electrode of the third transistor T3 is electrically connected to the reference voltage terminal RF, and the drain electrode of the third transistor T3 is electrically connected to the third node N3;

The gate electrode of the fourth transistor T4 is electrically connected to the first reset line R1, the source electrode of the fourth transistor T4 is electrically connected to the reference voltage terminal RF, and the drain electrode of the fourth transistor T4 is electrically connected to the first node N1;

The data writing-in circuit includes a fifth transistor T5;

The gate electrode of the fifth transistor T5 is electrically connected to the scanning line G1, the source electrode of the fifth transistor T5 is electrically connected to the data line DA, and the drain electrode of the fifth transistor T5 is electrically connected to the fourth node N4;

The fifth transistor T5 is an n-type transistor;

The third reset circuit includes a seventh transistor T7;

The gate electrode of the seventh transistor T7 is electrically connected to the second reset line R2, the source electrode of the seventh transistor T7 is electrically connected to the initial voltage terminal I1, and the drain electrode of the seventh transistor T7 is electrically connected to the anode of the organic light emitting diode O1;

The cathode of the organic light emitting diode O1 is electrically connected to the low voltage terminal ELVSS.

Optionally, T1, T2, T3, T4, T5 and T7 can all be n-type transistors, and the n-type transistors can be oxide transistors. For example, T1, T2, T3, T4, T5 and T7 can all be oxide transistors; for example, the oxide transistor can be an Indium Gallium Zinc (IGZO) transistor.

Figure 24:
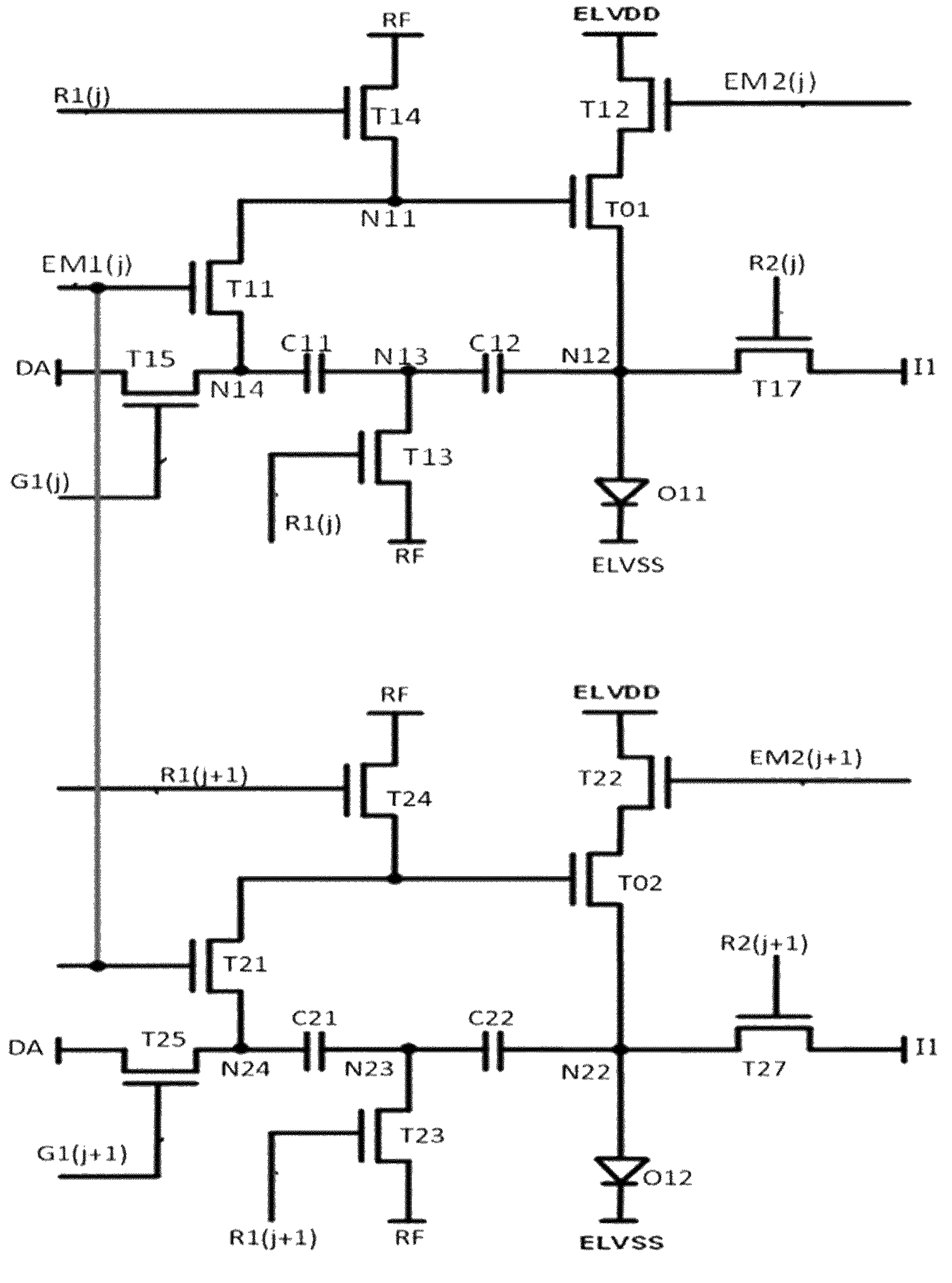
FIG. 24 is a schematic diagram of the connection relationship of the two stages of pixel circuits in the display substrate according to the embodiment of the present disclosure.

As shown in FIG. 24, in the jth stage of pixel circuit, the first light emitting control circuit includes a first first transistor T11, the second light emitting control circuit includes a first second transistor T12, the driving circuit includes a first driving transistor T01; the first energy storage circuit includes a first first capacitor C11, the second energy storage circuit includes a first second capacitor C12, the first reset circuit includes a first third transistor T13, and the second reset circuit includes a first fourth transistor T14; the data writing-in circuit includes a first fifth transistor T15; the first third reset circuit includes a first seventh transistor T17; j is a positive integer;

The gate electrode of T11 is electrically connected to the jth stage of first light emitting control line EM1(*j*), the source electrode of T11 is electrically connected to the first first node N11, and the drain electrode of T11 is electrically connected to the first fourth node N14;

The gate electrode of T12 is electrically connected to the jth stage of second light emitting control line EM2(*j*), the source electrode of T12 is electrically connected to the power supply voltage terminal ELVDD, and the drain electrode of T12 is electrically connected to the source electrode of the first driving transistor T01;

The first terminal of C11 is electrically connected to the first third node N13, and the second terminal of C11 is electrically connected to the first fourth node N14;

The first terminal of C12 is electrically connected to the first second node N12, and the second terminal of C12 is electrically connected to the first third node N13;

The gate electrode of T13 is electrically connected to the jth stage of first reset line R1(*j*), the source electrode of T13 is electrically connected to the reference voltage terminal RF, and the drain electrode of T13 is electrically connected to the first third node N13;

The gate electrode of T14 is electrically connected to the jth stage of first reset line R1(*j*), the source electrode of T14 is electrically connected to the reference voltage terminal RF, and the drain electrode of T14 is electrically connected to the first first node N11;

The gate electrode of T15 is electrically connected to the jth stage of scanning line G1(*j*), the source electrode of T15 is electrically connected to the data line DA, and the drain electrode of T15 is electrically connected to the first fourth node N14;

The gate electrode of T17 is electrically connected to the jth stage of second reset line R2(*j*), the source electrode of T17 is electrically connected to the initial voltage terminal I1, and the drain electrode of T17 is electrically connected to the anode of the first organic light emitting diode O11;

the cathode of the first organic light emitting diode O11 is electrically connected to the low voltage terminal ELVSS;

in the g+1)th stage of pixel circuit, the first light emitting control circuit includes a second first transistor T21, the second light emitting control circuit includes a second second transistor T22, and the driving circuit includes a second driving transistor T02; the first energy storage circuit includes a second first capacitor C21, the second energy storage circuit includes a second second capacitor C22, the first reset circuit includes a second third transistor T23, and the second reset circuit includes a second fourth transistor T24; the data writing-in circuit includes a second fifth transistor T25; the second third reset circuit includes a second seventh transistor T27; j is a positive integer;

The gate electrode of T21 is electrically connected to the jth stage of first light emitting control line EM1(*j*), the source electrode of T21 is electrically connected to the second first node N21, and the drain electrode of T21 is electrically connected to the second fourth node N24;

The gate electrode of T22 is electrically connected to the (j+1)th stage of second light emitting control line EM2(*j*+1), the source electrode of T22 is electrically connected to the power supply voltage terminal ELVDD, and the drain electrode of T22 is electrically connected to the source electrode of the second driving transistor T02;

The first terminal of C21 is electrically connected to the second third node N23, and the second terminal of C21 is electrically connected to the second fourth node N24;

The first terminal of C22 is electrically connected to the second second node N22, and the second terminal of C22 is electrically connected to the second third node N23;

The gate electrode of T23 is electrically connected to the (j+1)th stage of first reset line R1(*j*+1), the source electrode of T23 is electrically connected to the reference voltage terminal RF, and the drain electrode of T23 is electrically connected to the second third node N23;

The gate electrode of T24 is electrically connected to the (j+1)th stage of first reset line R1(*j*+1), the source electrode of T24 is electrically connected to the reference voltage terminal RF, and the drain electrode of T24 is electrically connected to the second first node N21;

The gate electrode of T25 is electrically connected to the (j+1)th stage of scanning line G1(*j*+1), the source electrode of T25 is electrically connected to the data line DA, and the drain electrode of T25 is electrically connected to the second fourth node N14;

The gate electrode of T27 is electrically connected to the (j+1)th stage of second reset line R2(*j*+1), the source electrode of T27 is electrically connected to the initial voltage terminal I1, and the drain electrode of T27 is electrically connected to the anode of the second organic light emitting diode O12;

The cathode of the second organic light emitting diode O12 is electrically connected to the low voltage terminal ELVSS.

In at least one embodiment shown in FIG. 24, EM1(*j*) and EM1(*j*+1) are electrically connected.

Figure 25:
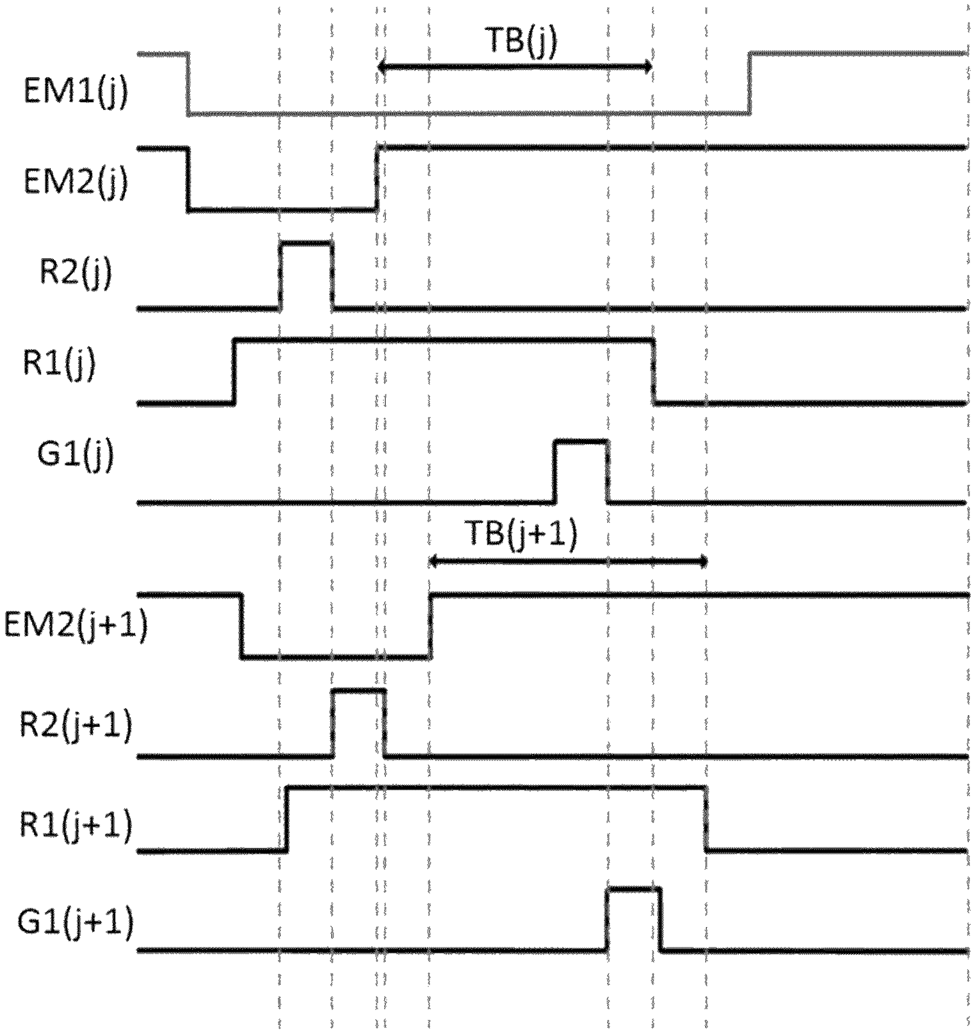
FIG. 25 is a working timing diagram of at least one embodiment shown in FIG. 24.

FIG. 25 is a working timing diagram of the two stages of pixel circuits shown in FIG. 24.

In the two stages of pixel circuits shown in FIG. 24 of the present disclosure, the first light emitting control lines of the adjacent two stages of pixel circuits are electrically connected to each other;

The jth stage of first light emitting control line EM1(*j*) controls the on and off of T11 and T21 included in the two stages of pixel circuits, and has no effect on the time of threshold voltage compensation of each row, and the number of gate driving units generating the first light emitting control signal can be halved; but not limited to this; the jth of first light emitting control line EM1(*j*) can also control more adjacent row pixel circuits as long as the threshold voltage compensation time remains unchanged.

In at least one embodiment of the present disclosure, the compensation time of the threshold voltage is determined by the time difference between the rising edge of the second light emitting control signal provided by the second light emitting control line and the falling edge of the first reset signal provided by the first reset line, and during the compensation period, the potential of the first light emitting control signal is an invalid level. Therefore, as long as the falling edge of the first reset signal of the (j+n)th row of pixel circuits is before the rising edge of the jth stage of first light emitting control signal, the first light emitting control lines in the jth row of pixel circuit to the (j+n)th row of pixel circuit can be electrically connected to each other; wherein n is an integer greater than or equal to 2.

In FIG. 25, the period labeled TB(j) is the jth stage of compensation time period, and the period labeled TB(j+1) is the (j+1)th stage of compensation time period.

As shown in FIG. 25, the threshold voltage compensation time of the adjacent row pixel circuits is unchanged.

Figure 26:
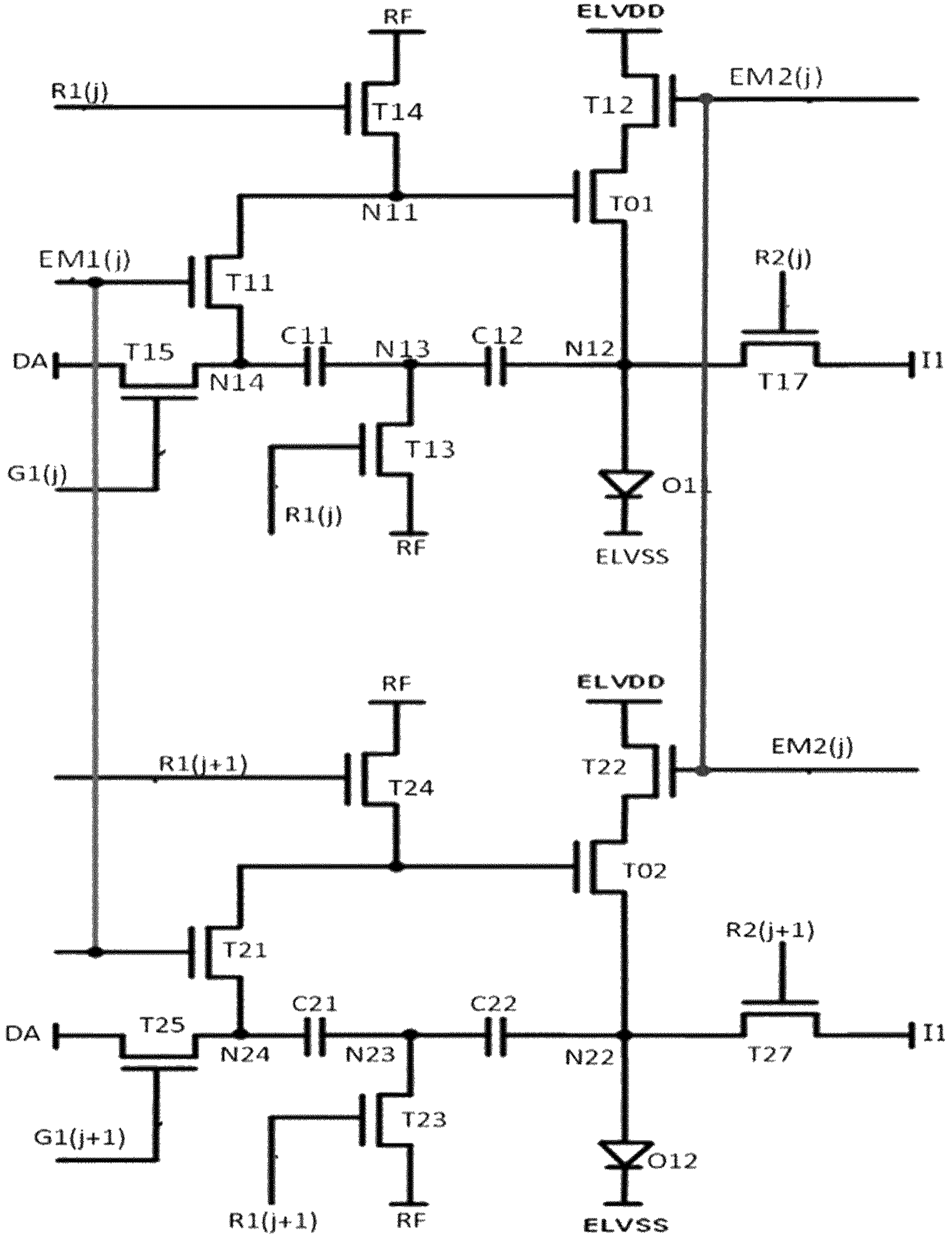
FIG. 26 is a schematic diagram of the connection relationship of the two stages of pixel circuit in the display substrate according to the embodiment of the present disclosure.

As shown in FIG. 26, in the jth stage of pixel circuits, the first light emitting control circuit includes a first first transistor T11, the second light emitting control circuit includes a first second transistor T12, and the driving circuit includes a first driving transistor T01; the first energy storage circuit includes a first first capacitor C11, the second energy storage circuit includes a first second capacitor C12, the first reset circuit includes a first third transistor T13, and the second reset circuit includes a first fourth transistor T14; the data writing-in circuit includes a first fifth transistor T15; the first third reset circuit includes a first seventh transistor T17; j is a positive integer;

The gate electrode of T11 is electrically connected to the jth stage of first light emitting control line EM1(*j*), the source electrode of T11 is electrically connected to the first first node N11, and the drain electrode of T11 is electrically connected to the first fourth node N14;

The gate electrode of T12 is electrically connected to the jth stage of second light emitting control line EM2(*j*), the source electrode of T12 is electrically connected to the power supply voltage terminal ELVDD, and the drain electrode of T12 is electrically connected to the source electrode of the first driving transistor T01;

The first terminal of C11 is electrically connected to the first third node N13, the second terminal of C11 is electrically connected to the first fourth node N14;

The first terminal of C12 is electrically connected to the first second node N12, and the second terminal of C12 is electrically connected to the first third node N13;

The gate electrode of T13 is electrically connected to the jth stage of first reset line R1(*j*), the source electrode of T13 is electrically connected to the reference voltage terminal RF, and the drain electrode of T13 is electrically connected to the first third node N13;

The gate electrode of T14 is electrically connected to the jth stage of first reset line R1(*j*), the source electrode of T14 is electrically connected to the reference voltage terminal RF, and the drain electrode of T14 is electrically connected to the first first node N11;

The gate electrode of T15 is electrically connected to the jth stage of scanning line G1 (*j*), the source electrode of T15 is electrically connected to the data line DA, and the drain electrode of T15 is electrically connected to the first fourth node N14;

The gate electrode of T17 is electrically connected to the jth stage of second reset line R2 (*j*), the source electrode of T17 is electrically connected to the initial voltage terminal I1, and the drain electrode of T17 is electrically connected to the anode of the first organic light emitting diode O11;

The cathode of the first organic light emitting diode O11 is electrically connected to the low voltage terminal ELVSS;

In the (j+1)th stage of pixel circuit, the first light emitting control circuit includes a second first transistor T21, the second light emitting control circuit includes a second second transistor T22, the driving circuit includes a second driving transistor T02; the first energy storage circuit includes a second first capacitor C21, the second energy storage circuit includes a second second capacitor C22, the first reset circuit includes a second third transistor T23, and the second reset circuit includes a second fourth transistor T24; the data writing-in circuit includes a second fifth transistor T25; the second third reset circuit includes a second seventh transistor T27; j is a positive integer;

The gate electrode of T21 is electrically connected to the jth stage of first light emitting control line EM1(*j*), the source electrode of T21 is electrically connected to the second first node N21, and the drain electrode of T21 is electrically connected to the second fourth node N24;

The gate electrode of T22 is electrically connected to the jth stage of second light emitting control line EM2(*j*), the source electrode of T22 is electrically connected to the power supply voltage terminal ELVDD, and the drain electrode of T22 is electrically connected to the source electrode of the second driving transistor T02;

The first terminal of C21 is electrically connected to the second third node N23, and C21 is electrically connected to the second fourth node N24;

The first terminal of C22 is electrically connected to the second second node N22, and the second terminal of C22 is electrically connected to the second third node N23;

The gate electrode of T23 is electrically connected to the (j+1)th stage of first reset line R1(*j*+1), the source electrode of T23 is electrically connected to the reference voltage terminal RF, and the drain electrode of T23 is electrically connected to the second third node N23;

The gate electrode of T24 is electrically connected to the (j+1)th stage of first reset line R1(*j*+1), the source electrode of T24 is electrically connected to the reference voltage terminal RF, and the drain electrode of T24 is electrically connected to the second first node N21;

The gate electrode of T25 is electrically connected to the (j+1)th stage of scanning line G1(*j*+1), the source electrode of T25 is electrically connected to the data line DA, and the drain electrode of T25 is electrically connected to the second fourth node N14;

The gate electrode of T27 is electrically connected to the (j+1)th stage of second reset line R2(*j*+1), the source electrode of T27 is electrically connected to the initial voltage terminal I1, and the drain electrode of T27 is electrically connected to the anode of the second organic light emitting diode O12;

The cathode of the second organic light emitting diode O12 is electrically connected to the low voltage terminal ELVSS.

Figure 27:
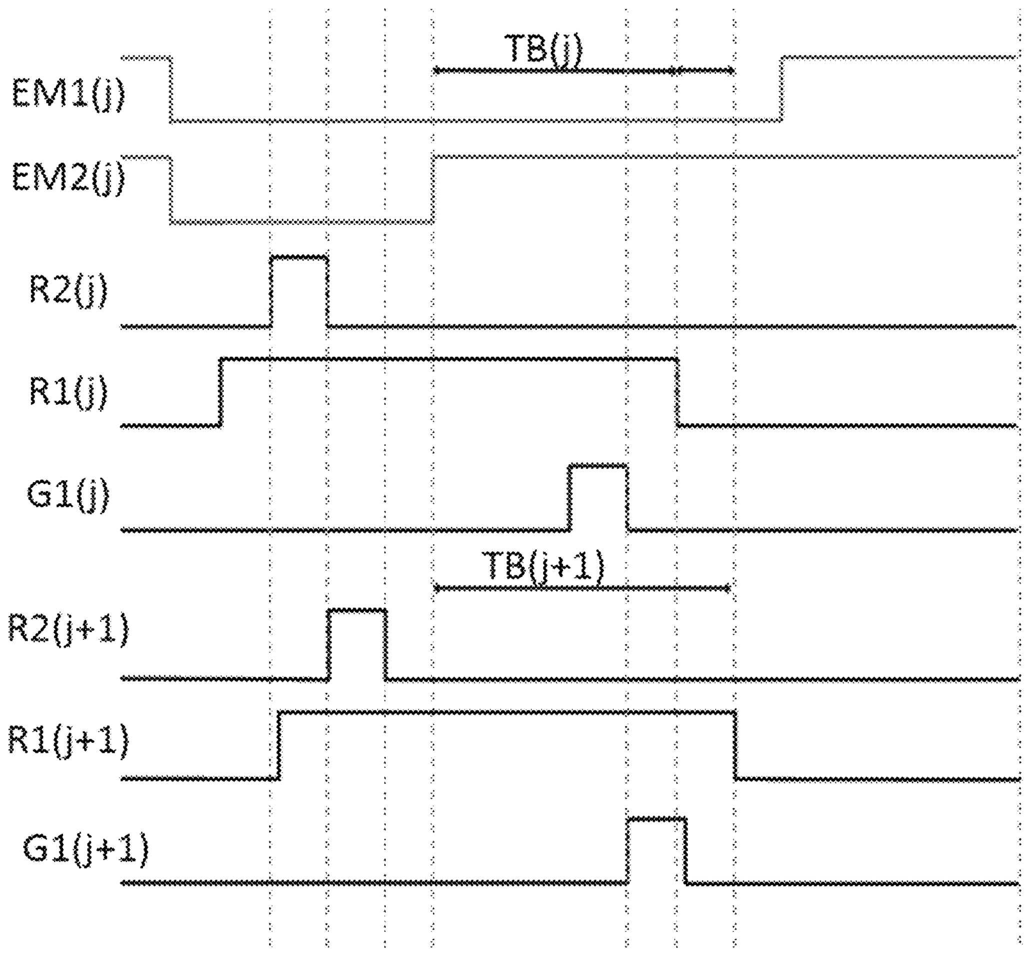
FIG. 27 is a working timing diagram of at least one embodiment shown in FIG. 26.

FIG. 27 is a working timing diagram of the two stages of pixel circuit shown in FIG. 26.

In FIG. 27, the period labeled TB(j) is the jth stage of compensation period, and the period labeled TB(j+1) is the (j+1)th stage of compensation period.

In the two stages of pixel circuits shown in FIG. 26 of the present disclosure, the first light emitting control lines of the adjacent two stages of pixel circuits are electrically connected to each other, and the second light emitting control lines of the adjacent two stages of pixel circuits are electrically connected;

The first transistors in the adjacent two stages of pixel circuits share the jth stage of first light emitting control line EM1(*j*), and the second transistors in the adjacent two stages of pixel circuits share the jth stage of second light emitting control line EM2(*j*), which can further reduce the number of gate driving units used and reduce the border, but the threshold voltage compensation time of the adjacent two stages of pixel circuits is inconsistent. Therefore, the compensation time of the threshold voltage of each row can be further limited, and the compensation time of the threshold voltage of each row is at least greater than 2H (1H is a row scanning time), and can even be greater than 30H. The greater the compensation time is, the smaller the difference in compensation effect of adjacent rows is, which can eventually be ignored, but is not limited to this; EM1(*j*) and EM2(*j*) can also control more adjacent rows of pixel circuits.

In at least one embodiment of the present disclosure, the compensation time of the threshold voltage is determined by the time difference between the rising edge of the second light emitting control signal provided by the second light emitting control line and the falling edge of the first reset signal provided by the first reset line, and during the compensation period, the potential of the first light emitting control signal is an invalid level. Therefore, as long as the falling edge of the first reset signal of the (j+n)th row of pixel circuits is before the rising edge of the jth stage of first light emitting control signal, the first light emitting control lines of the jth row of pixel circuits to the (j+n)th row of pixel circuits can be electrically connected to each other. Wherein, n is an integer greater than or equal to 2.

For the discrete pixel circuit represented by the present disclosure, when driven at 120 Hz, the compensation time of the threshold voltage can be more than ten times, even twenty times, or more than thirty times of 1H.

Figure 28:
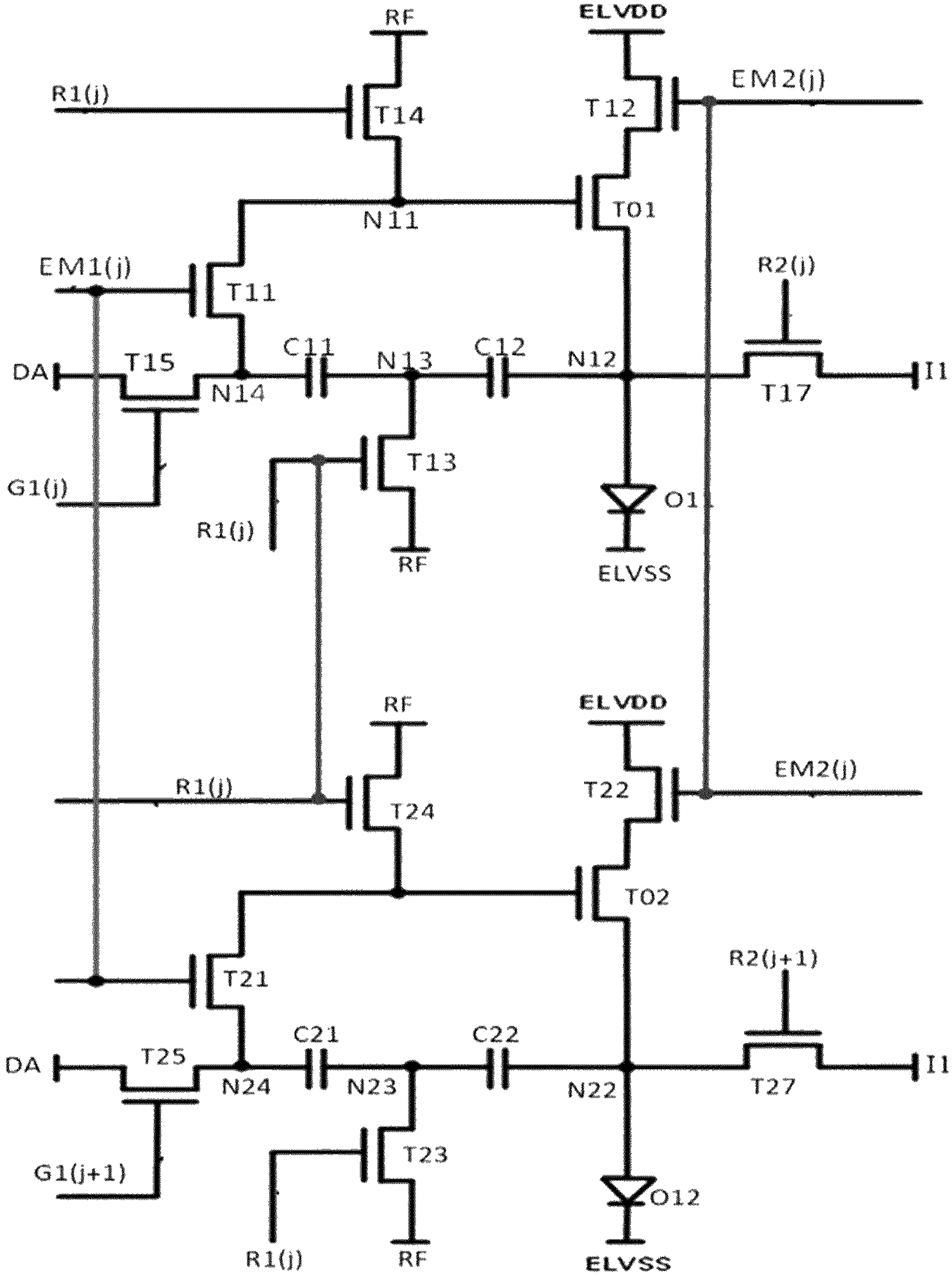
FIG. 28 is a schematic diagram of the connection relationship of the two stages of pixel circuits in the display substrate according to the embodiment of the present disclosure.

As shown in FIG. 28, in the jth stage of pixel circuit, the first light emitting control circuit includes a first first transistor T11, the second light emitting control circuit includes a first second transistor T12, the driving circuit includes a first driving transistor T01; the first energy storage circuit includes a first first capacitor C11, the second energy storage circuit includes a first second capacitor C12, the first reset circuit includes a first third transistor T13, and the second reset circuit includes a first fourth transistor T14; the data writing-in circuit includes a first fifth transistor T15; the first third reset circuit includes a first seventh transistor T17; j is a positive integer;

The gate electrode of T11 is electrically connected to the jth stage of first light emitting control line EM1(*j*), the source electrode of T11 is electrically connected to the first first node N11, and the drain electrode of T11 is electrically connected to the first fourth node N14;

The gate electrode of T12 is electrically connected to the jth stage of second light emitting control line EM2(*j*), the source electrode of T12 is electrically connected to the power supply voltage terminal ELVDD, and the drain electrode of T12 is electrically connected to the source electrode of the first driving transistor T01;

The first terminal of C11 is electrically connected to the first third node N13, and the second terminal of C11 is electrically connected to the first fourth node N14;

The first terminal of C12 is electrically connected to the first second node N12, and the second terminal of C12 is electrically connected to the first third node N13;

The gate electrode of T13 is electrically connected to the jth stage of first reset line R1(*j*), the source electrode of T13 is electrically connected to the reference voltage terminal RF, and the drain electrode of T13 is electrically connected to the first third node N13;

The gate electrode of T14 is electrically connected to the jth stage of first reset line R1(*j*), the source electrode of T14 is electrically connected to the reference voltage terminal RF, and the drain electrode of T14 is electrically connected to the first first node N11;

The gate electrode of T15 is electrically connected to the jth stage of scanning line G1(*j*), the source electrode of T15 is electrically connected to the data line DA, and the drain electrode of T15 is electrically connected to the first fourth node N14;

The gate electrode of T17 is electrically connected to the jth stage of second reset line R2(*j*), the source electrode of T17 is electrically connected to the initial voltage terminal I1, and the drain electrode of T17 is electrically connected to the anode of the first organic light emitting diode O11;

The cathode of the first organic light emitting diode O11 is electrically connected to the low voltage terminal ELVSS;

In the (j+1)th stage of pixel circuit, the first light emitting control circuit includes a second first transistor T21, the second light emitting control circuit includes a second second transistor T22, and the driving circuit includes a second driving transistor T02; the first energy storage circuit includes a second first capacitor C21, the second energy storage circuit includes a second second capacitor C22, and the first reset circuit includes a second third transistor T23, the second reset circuit includes a second fourth transistor T24; the data writing-in circuit includes a second fifth transistor T25; the second third reset circuit includes a second seventh transistor T27; j is a positive integer;

The gate electrode of T21 is electrically connected to the jth stage of first light emitting control line EM1(*j*), the source electrode of T21 is electrically connected to the second first node N21, and the drain electrode of T21 is electrically connected to the second fourth node N24;

The gate electrode of T22 is electrically connected to the jth stage of second light emitting control line EM2(*j*), the source electrode of T22 is electrically connected to the power supply voltage terminal ELVDD, and the drain electrode of T22 is electrically connected to the source electrode of the second driving transistor T02;

The first terminal of C21 is electrically connected to the second third node N23, and the second terminal of C21 is electrically connected to the second fourth node N24;

The first terminal of C22 is electrically connected to the second second node N22, and the second terminal of C22 is electrically connected to the second third node N23;

The gate electrode of T23 is electrically connected to the jth stage of first reset line R1(*j*), the source electrode of T23 is electrically connected to the reference voltage terminal RF, and the drain electrode of T23 is electrically connected to the second third node N23;

The gate electrode of T24 is electrically connected to the (j+1)th stage of first reset line R1(*j*), the source electrode of T24 is electrically connected to the reference voltage terminal RF, and the drain electrode of T24 is electrically connected to the second first node N21;

The gate electrode of T25 is electrically connected to the (j+1)th stage of scanning line G1(*j*+1), the source electrode of T25 is electrically connected to the data line DA, and the drain electrode of T25 is electrically connected to the second fourth node N14;

The gate electrode of T27 is electrically connected to the (j+1)th stage of second reset line R2(*j*+1), the source electrode of T27 is electrically connected to the initial voltage terminal I1, and the drain electrode of T27 is electrically connected to the anode of the second organic light emitting diode O12;

The cathode of the second organic light emitting diode O12 is electrically connected to the low voltage terminal ELVSS.

Figure 29:
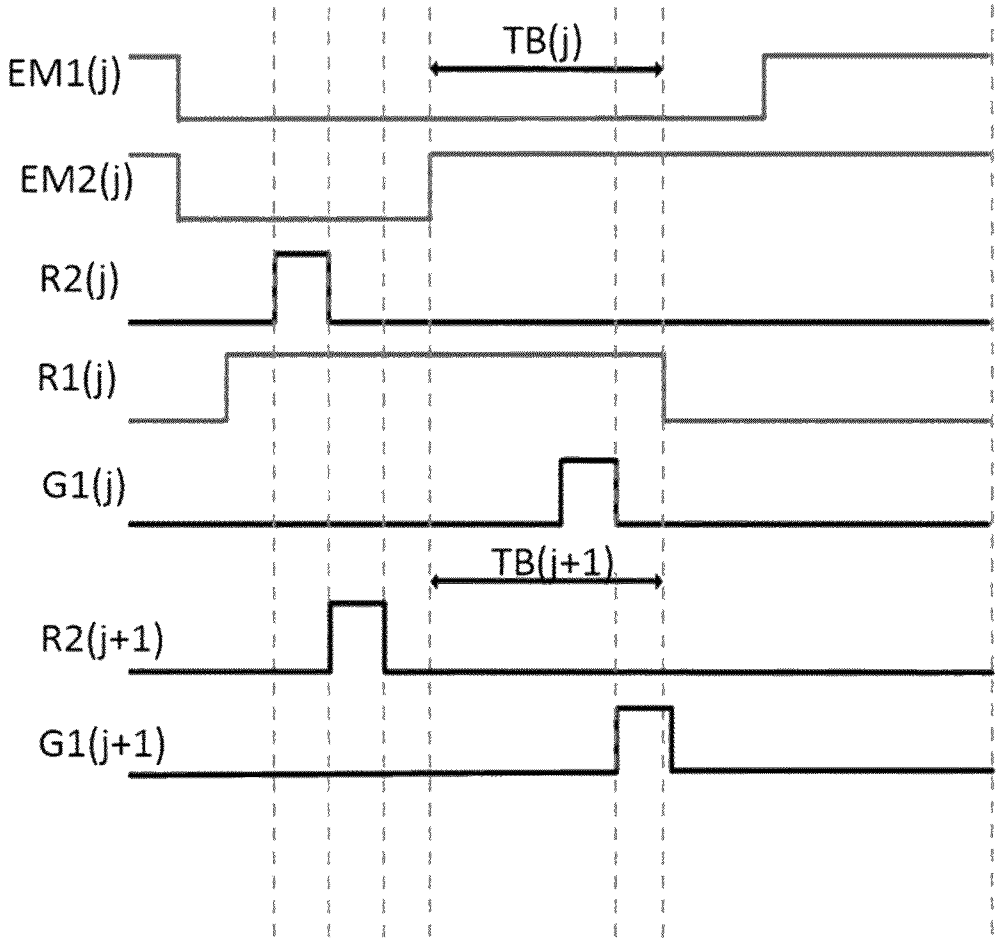
FIG. 29 is a working timing diagram of at least one embodiment shown in FIG. 28.

FIG. 29 is a working timing diagram of the two stages of pixel circuit shown in FIG. 28.

In FIG. 29, the period labeled TB(j) is the jth stage of compensation time period, and the period labeled TB(j+1) is the (j+1)th stage of compensation time period.

In the two stages of pixel circuit shown in FIG. 26 of the present disclosure, adjacent two stages of pixel circuits share the first light emitting control line, adjacent two stages of pixel circuits share the second light emitting control line, and adjacent two stages of pixel circuits share the first reset line.

In at least one embodiment of the two stages of pixel circuits shown in FIG. 28, the threshold voltage compensation time of the two stages of pixel circuits is the same.

In at least one embodiment of the present disclosure, the threshold voltage compensation time is determined by the time difference from the rising edge of the second light emitting control signal provided by the second light emitting control line to the falling edge of the first reset signal provided by the first reset line.

In at least one embodiment of the present disclosure, the threshold voltage compensation time of each stage of pixel circuit is consistent in the following three cases:

At least two stages of pixel circuits share the first light emitting control line;

At least two stages of pixel circuits share the first reset line, and at least two stages of pixel circuits share the second light emitting control line;

At least two stages of pixel circuits share the first light emitting control line, at least two stages of pixel circuits share the first reset line, and at least two stages of pixel circuits share the second light emitting control line.

Figure 30:
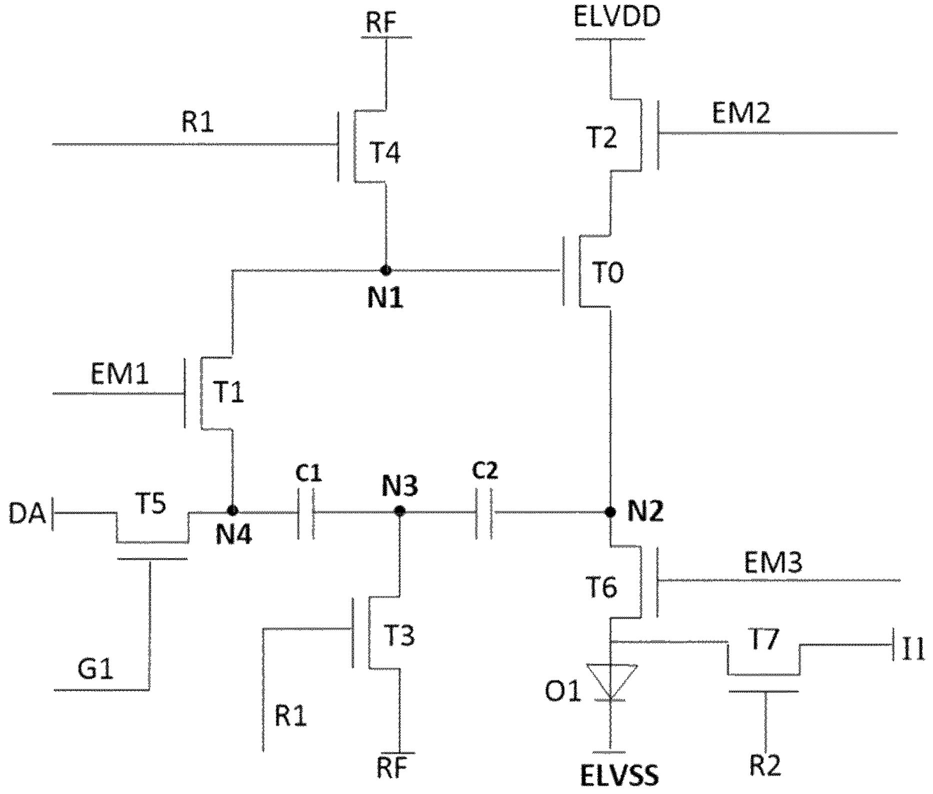
FIG. 30 is a circuit diagram of the pixel circuit in the display substrate according to the embodiment of the present disclosure.

The difference between the pixel circuit shown in FIG. 30 and the pixel circuit shown in FIG. 23 is that:

The pixel circuit shown in FIG. 30 adds the third light emitting control circuit, and the third light emitting control circuit includes a sixth transistor T6;

The gate electrode of the sixth transistor T6 is electrically connected to the third light emitting control line EM3, the source electrode of the sixth transistor T6 is electrically connected to the second node N2, and the drain electrode of the sixth transistor T6 is electrically connected to the anode of the organic light emitting diode O1.

In the pixel circuit shown in FIG. 30, a sixth transistor T6 is added, which is configured to prevent N2 from being coupled through the low voltage terminal ELVSS when the signal is written. When T6 is turned on and the anode potential of O1 is reset, T6 is turned on and the potential of N2 is reset at the same time. After resetting the potential of N2, T6 and T7 are turned off. After T1 is turned on, T6 is turned on again to conduct the light emitting path.

In specific implementation, at least two stages of pixel circuits can share the third light emitting control line.

Figure 31:
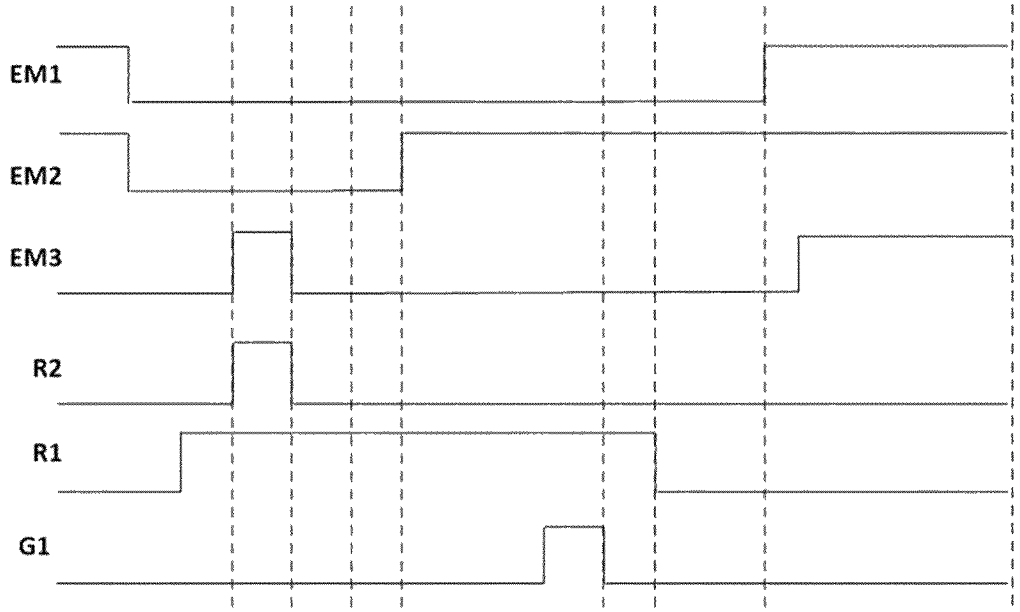
FIG. 31 is a working timing diagram of the pixel circuit shown in FIG. 30.

FIG. 31 is a working timing diagram of the pixel circuit shown in FIG. 30.

Figure 32:
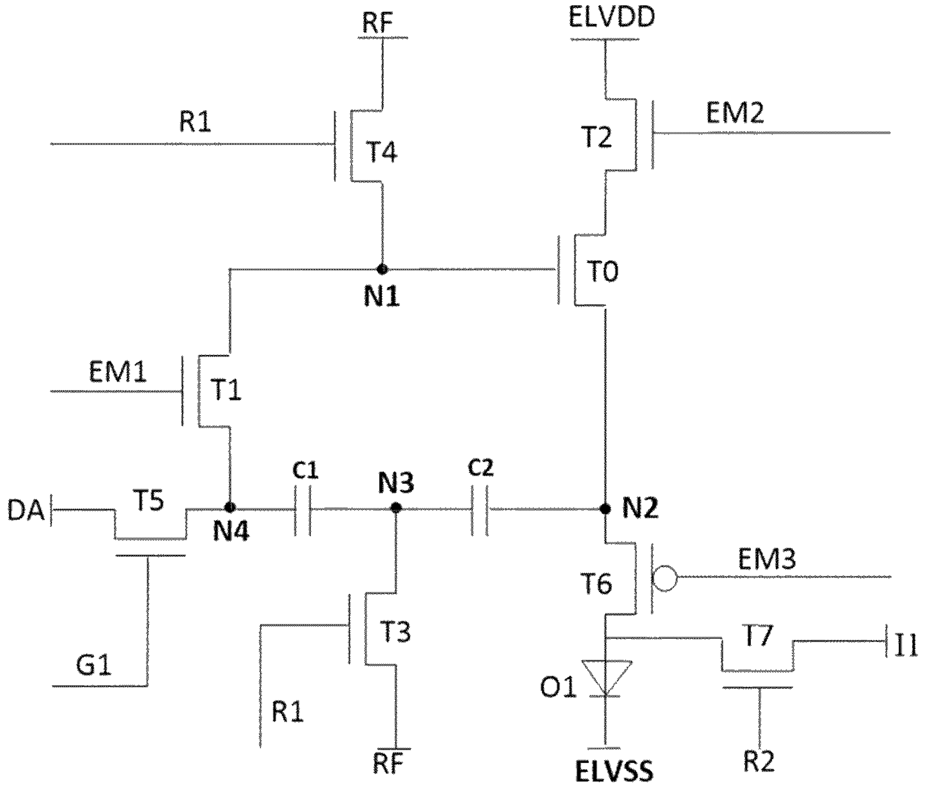
FIG. 32 is a circuit diagram of the pixel circuit in the display substrate according to the embodiment of the present disclosure.

The difference between the pixel circuit shown in FIG. 32 and the pixel circuit shown in FIG. 30 is that:

T6 is a p-type transistor.

Figure 33:
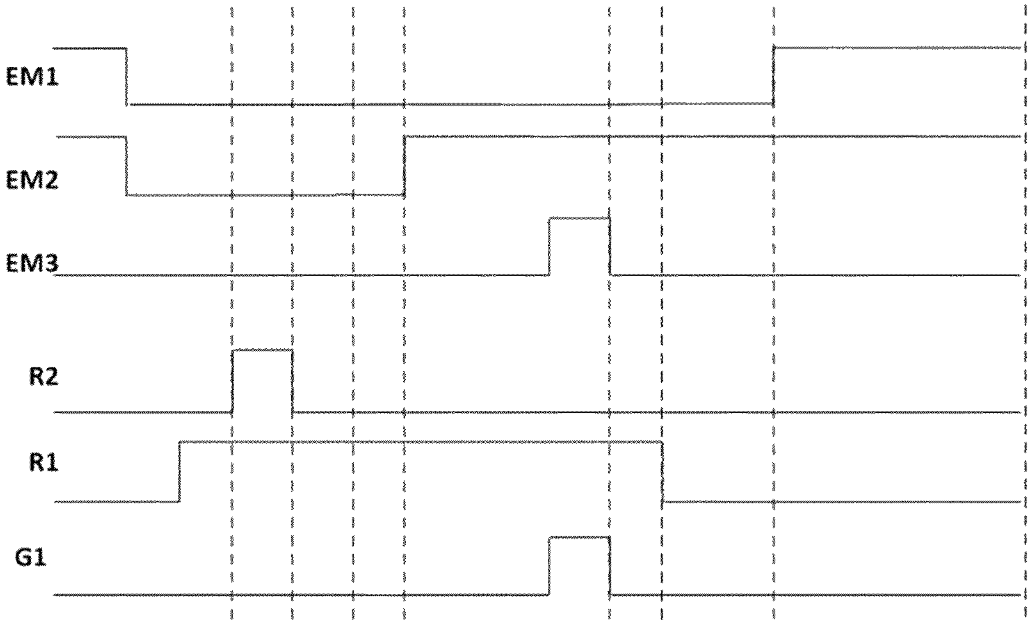
FIG. 33 is a working timing diagram of the pixel circuit shown in FIG. 32.

FIG. 33 is a working timing diagram of the pixel circuit shown in FIG. 30.

As shown in FIG. 33, the waveform diagram of the third light emitting control signal provided by EM3 is the same as the waveform diagram of the scanning signal provided by G1. In the pixel circuit shown in FIG. 32, the gate electrode of T6 can also be electrically connected to G1.

Figure 34:
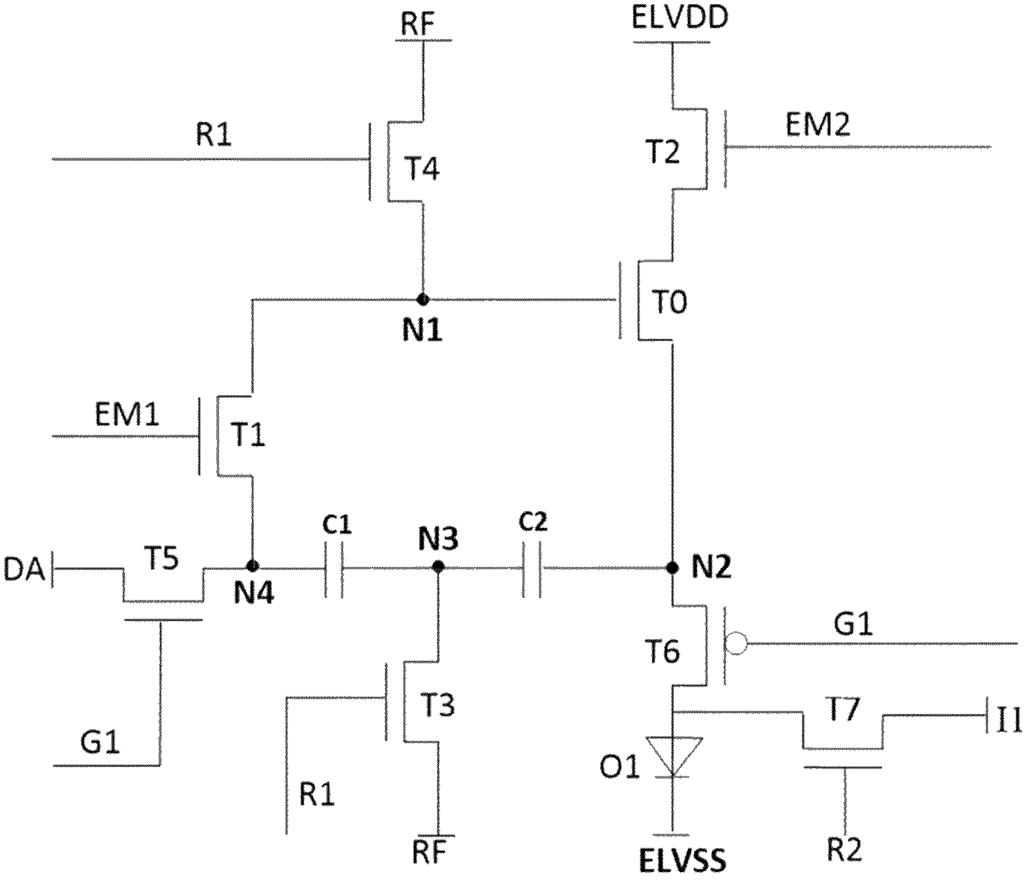
FIG. 34 is a schematic diagram of the pixel circuit in the display substrate according to the embodiment of the present disclosure.

The difference between the pixel circuit shown in FIG. 34 and the pixel circuit shown in FIG. 30 is that: the gate electrode of T6 is electrically connected to the scanning line G1, and T6 is a p-type transistor.

In the pixel circuit shown in FIG. 34, when T6 is a p-type transistor, the gate electrode of T6 and the gate electrode of T5 can both be electrically connected to the scanning line G1, so that when the data voltage is written, T6 is turned off, and the change of the low voltage signal provided by ELVSS will not affect the potential of N2. In the low-frequency maintenance frame, T7 is turned on, and the potential of the anode of O1 is reset at the high frequency.

Figure 35:
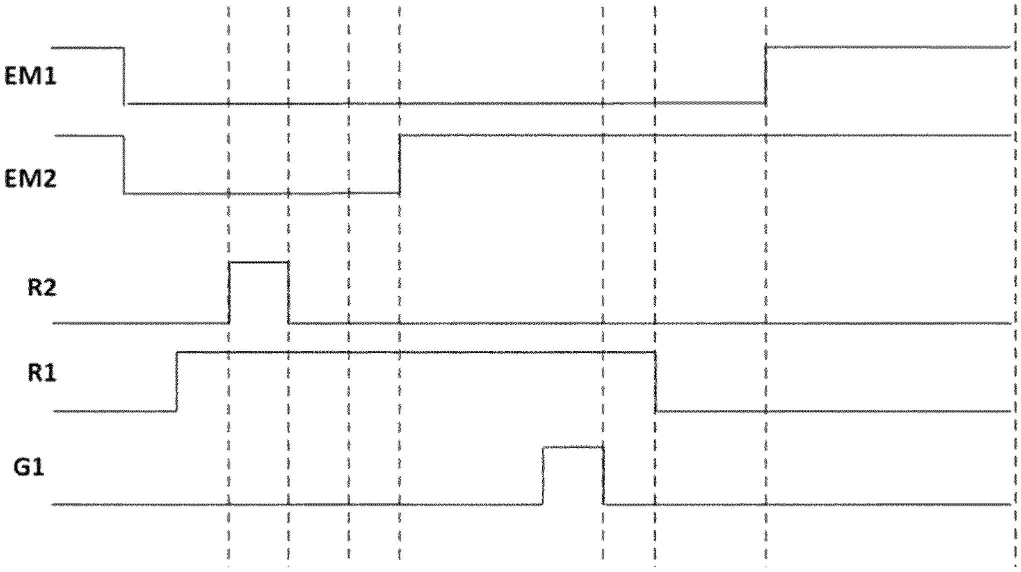
FIG. 35 is a working timing diagram of the pixel circuit shown in FIG. 34.

FIG. 35 is a working timing diagram of the pixel circuit shown in FIG. 34.

Figure 36:
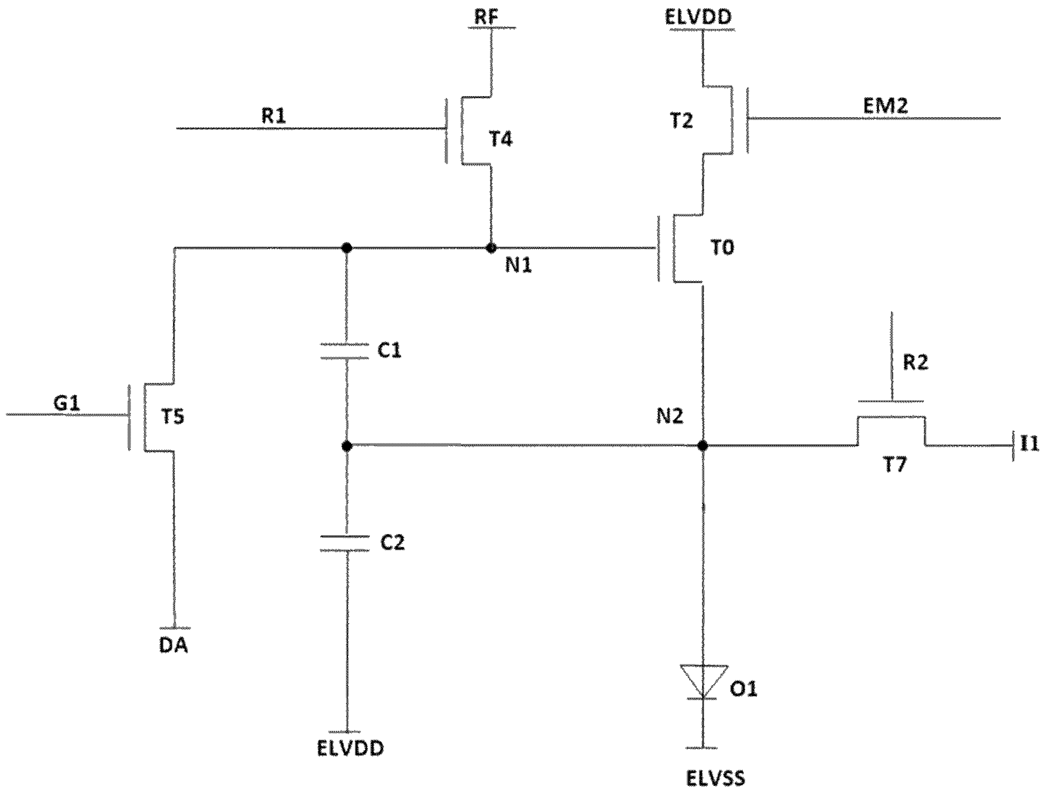
FIG. 36 is a circuit diagram of the pixel circuit in the display substrate according to the embodiment of the present disclosure.

As shown in FIG. 36, the pixel circuit according to at least one embodiment of the present disclosure includes a light emitting element, a second light emitting control circuit, a driving circuit, a first energy storage circuit, a second energy storage circuit, a second reset circuit, a data writing-in circuit and a third reset circuit;

The light emitting element is an organic light emitting diode O1;

The second light emitting control circuit includes a second transistor T2; the driving circuit includes a driving transistor TO;

The gate electrode of the second transistor T2 is electrically connected to the second light emitting control line EM2, the source electrode of the second transistor T2 is electrically connected to the power supply voltage terminal ELVDD, and the drain electrode of the second transistor T2 is electrically connected to the source electrode of the driving transistor T0;

The first energy storage circuit includes a first capacitor C1, and the second energy storage circuit includes a second capacitor C2;

The first terminal of the first capacitor C1 is electrically connected to the first node N1, and the second terminal of the first capacitor is electrically connected to the second node N2;

The first terminal of the second capacitor C2 is electrically connected to the second node N2, and the second terminal of the second capacitor C2 is electrically connected to the second node N2. The second terminal is electrically connected to the power supply voltage terminal ELVDD;

The second reset circuit includes a fourth transistor T4;

The gate electrode of the fourth transistor T4 is electrically connected to the first reset line R1, the source electrode of the fourth transistor T4 is electrically connected to the reference voltage terminal RF, and the drain electrode of the fourth transistor T4 is electrically connected to the first node N1;

The data writing-in circuit includes a fifth transistor T5;

The gate electrode of the fifth transistor T5 is electrically connected to the scanning line G1, the source electrode of the fifth transistor T5 is electrically connected to the data line DA, and the drain electrode of the fifth transistor T5 is electrically connected to the first node N1;

The third reset circuit includes a seventh transistor T7;

The gate electrode of the seventh transistor T7 is electrically connected to the second reset line R2, the source electrode of the seventh transistor T7 is electrically connected to the initial voltage terminal I1, and the drain electrode of the seventh transistor T7 is electrically connected to the anode of the organic light emitting diode O1;

The cathode of the organic light emitting diode O1 is electrically connected to the low voltage terminal ELVSS.

In the pixel circuit shown in FIG. 36, C2 may not be provided.

When the driving module according to at least one embodiment of the present disclosure includes at least two stages of pixel circuits as shown in FIG. 36, the adjacent two stages of pixel circuits can share at least one of the second light emitting control line and the first reset line.

Figure 37:
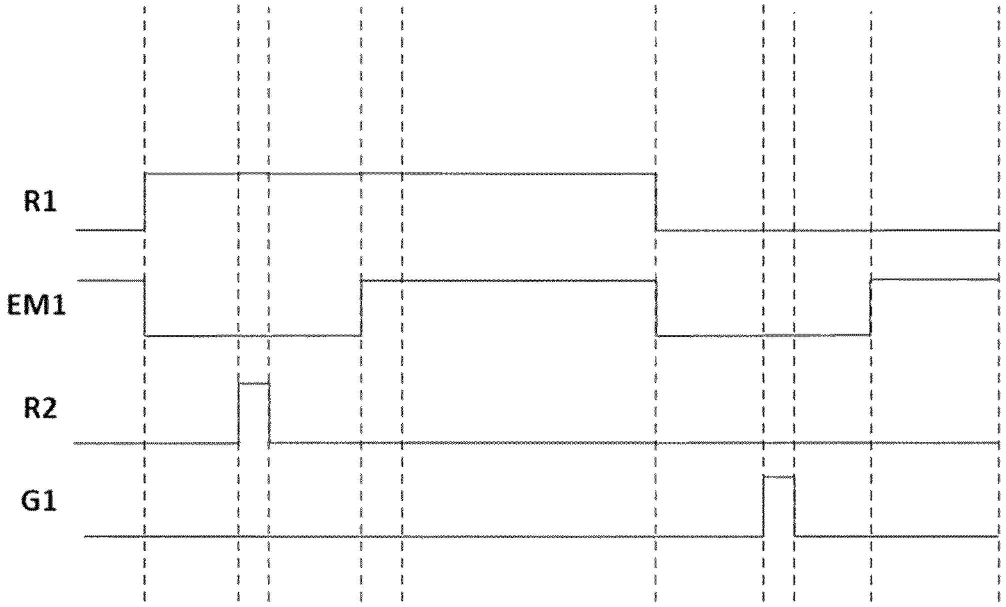
FIG. 37 is a working timing diagram of the pixel circuit shown in FIG. 36.

FIG. 37 is a working timing diagram of the pixel circuit shown in FIG. 36.

Figure 38:
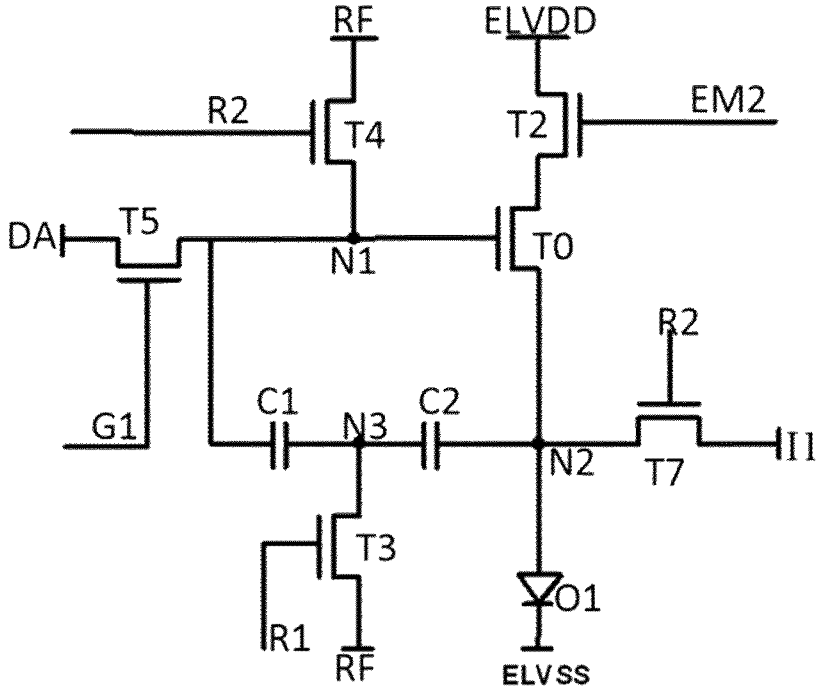
FIG. 38 is a circuit diagram of the pixel circuit in the display substrate according to the embodiment of the present disclosure.

As shown in FIG. 38, the pixel circuit according to at least one embodiment of the present disclosure includes a light emitting element, a second light emitting control circuit, a driving circuit, a first energy storage circuit, a second energy storage circuit, a first reset circuit, a second reset circuit, a data writing-in circuit and a third reset circuit;

The light emitting element is an organic light emitting diode O1;

The second light emitting control circuit includes a second transistor T2; the driving circuit includes a driving transistor T0;

The gate electrode of the second transistor T2 is electrically connected to the second light emitting control line EM2, the source electrode of the second transistor T2 is electrically connected to the power supply voltage terminal ELVDD, and the drain electrode of the second transistor T2 is electrically connected to the source electrode of the driving transistor T0;

The first energy storage circuit includes a first capacitor C1, and the second energy storage circuit includes a second capacitor C2;

The first terminal of the first capacitor C1 is electrically connected to the third node N3, and the second terminal of the first capacitor is electrically connected to the first node N1;

The first terminal of the second capacitor C2 is electrically connected to the second node N2, and the second terminal of the second capacitor is electrically connected to the third node N3;

The first reset circuit includes a third transistor T3, and the second reset circuit includes the fourth transistor T4;

The gate electrode of the third transistor T3 is electrically connected to the first reset line R1, the source electrode of the third transistor T3 is electrically connected to the reference voltage terminal RF, and the drain electrode of the third transistor T3 is electrically connected to the third node N3;

The gate electrode of the fourth transistor T4 is electrically connected to the second reset line R2, the source electrode of the fourth transistor T4 is electrically connected to the reference voltage terminal RF, and the drain electrode of the fourth transistor T4 is electrically connected to the first node N1;

The data writing-in circuit includes a fifth transistor T5;

The gate electrode of the fifth transistor T5 is electrically connected to the scanning line G1, the source electrode of the fifth transistor T5 is electrically connected to the data line DA, and the drain electrode of the fifth transistor T5 is electrically connected to the first node N1;

The third reset circuit includes a seventh transistor T7;

The gate electrode of the seventh transistor T7 is electrically connected to the second reset line R2, the source electrode of the seventh transistor T7 is electrically connected to the initial voltage terminal I1, and the drain electrode of the seventh transistor T7 is electrically connected to the anode of the organic light emitting diode O1;

The cathode of the organic light emitting diode O1 is electrically connected to the low voltage terminal ELVSS.

When the driving module according to at least one embodiment of the present disclosure includes at least two stages of pixel circuits as shown in FIG. 38, the adjacent two stages of pixel circuits can share at least one of the second light emitting control line and the first reset line.

Figure 39:
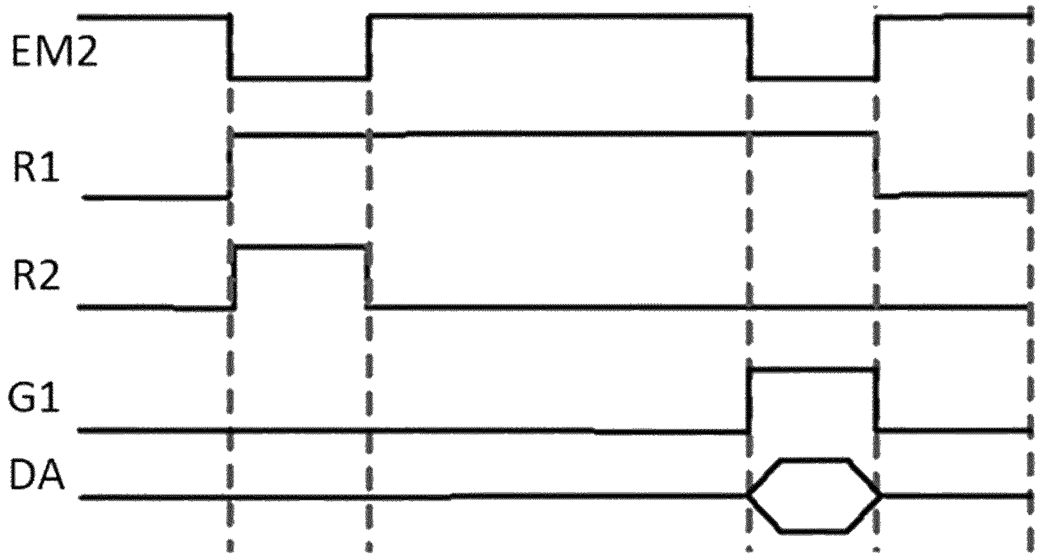
FIG. 39 is a working timing diagram of the pixel circuit shown in FIG. 30.

FIG. 39 is a working timing diagram of the pixel circuit shown in FIG. 38.

Figure 40:
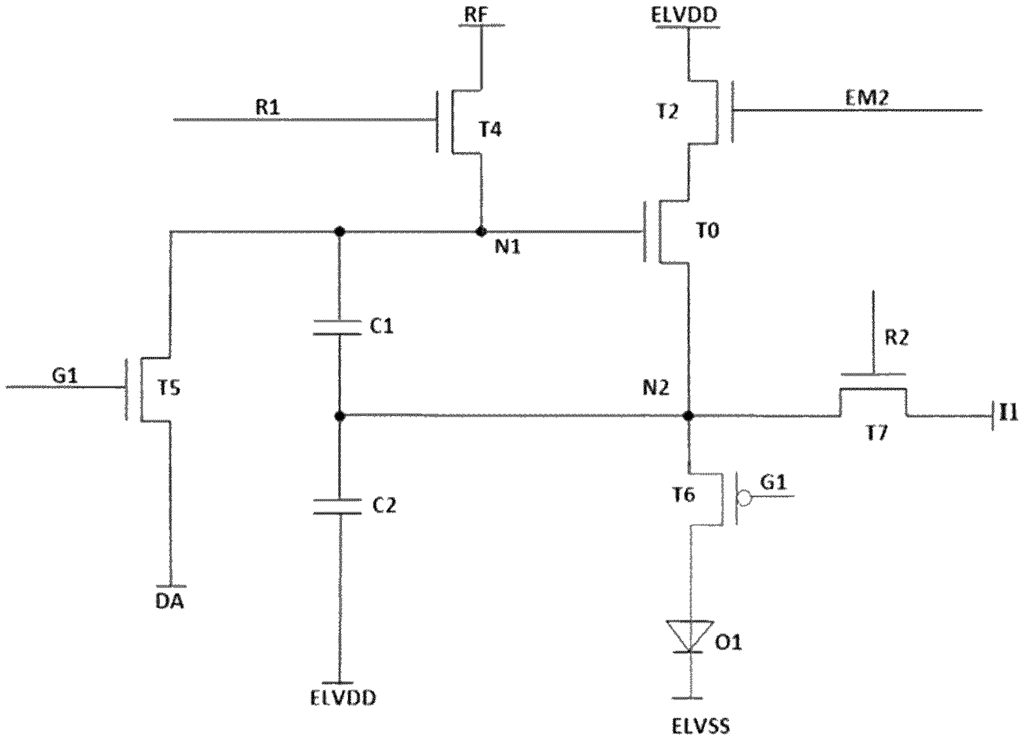
FIG. 40 is a circuit diagram of the pixel circuit in the display substrate according to the embodiment of the present disclosure.

The difference between the pixel circuit shown in FIG. 40 and the pixel circuit shown in FIG. 36 is that:

The pixel circuit shown in FIG. 40 also includes a sixth transistor T6;

The gate electrode of the sixth transistor T6 is electrically connected to the scanning line G1, the source electrode of the sixth transistor T6 is electrically connected to the drain electrode of T0, and the drain electrode of the sixth transistor T6 is electrically connected to the anode of O1;

T6 is a p-type transistor.

Figure 41:
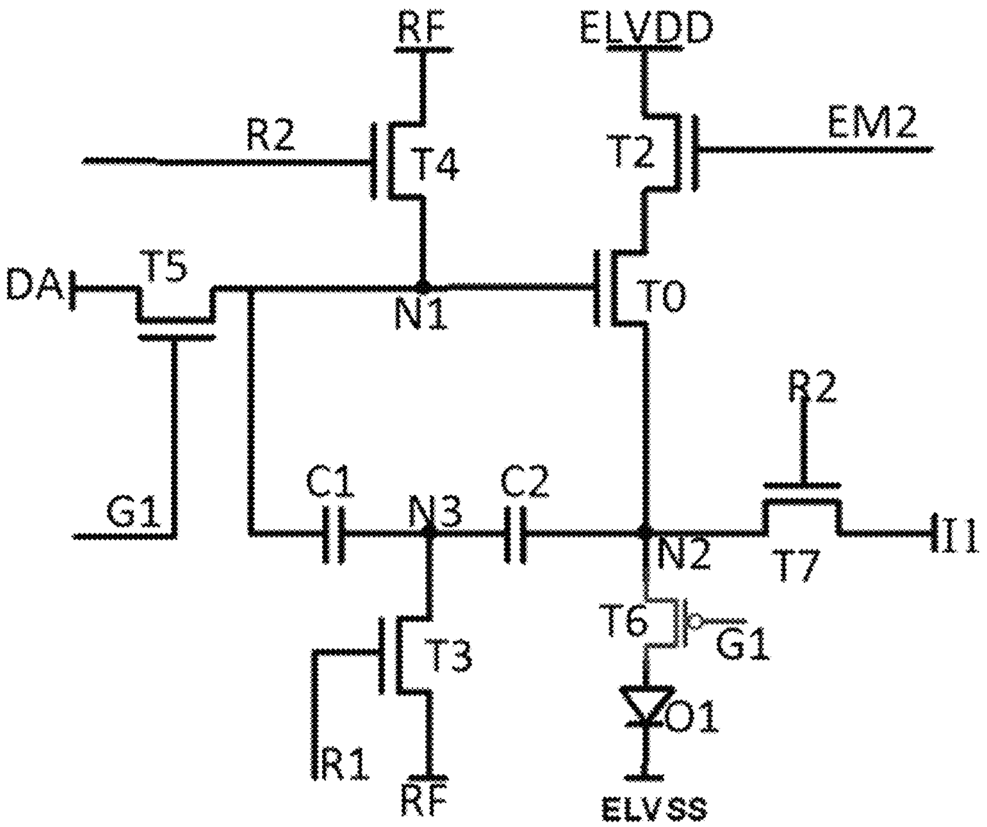
FIG. 41 is a circuit diagram of the pixel circuit in the display substrate according to the embodiment of the present disclosure.

The difference between the pixel circuit shown in FIG. 41 and the pixel circuit shown in FIG. 38 is that:

The pixel circuit shown in FIG. 41 also includes a sixth transistor T6;

The gate electrode of the sixth transistor T6 is electrically connected to the scanning line G1, the source electrode of the sixth transistor T6 is electrically connected to the drain electrode of T0, and the drain electrode of the sixth transistor T6 is electrically connected to the anode of O1;

T6 is a p-type transistor.

In the pixel circuit shown in FIG. 40 and the pixel circuit shown in FIG. 41, T6 can also be replaced by an n-type transistor, but the control signal of T6 needs to be replaced accordingly.

The driving method according to the embodiment of the present disclosure is applied to the above-mentioned display substrate, and the driving method includes: in at least two rows of pixel circuits included in the plurality of rows of pixel circuits, Controlling, by the first light emitting control circuit, the connection between the first node and the fourth node under the control of the first light emitting control signal provided by the same first light emitting control line; and/or, Controlling, by the second light emitting control circuit, the connection between the power supply voltage terminal and the first terminal of the driving circuit under the control of the second light emitting control signal provided by the same second light emitting control line; and/or, Controlling, by the first reset circuit, the potential of the third node under the control of the first reset signal provided by the same first reset line.

The display device according to the embodiment of the present disclosure includes the above-mentioned display substrate.

The display device according to at least one embodiment of the present disclosure also includes a gate driving circuit, and the gate driving circuit includes a plurality of stages of gate driving units;

The gate driving circuit is electrically connected to the control signal line to provide a control signal to the control signal line;

one stage of gate driving unit provides a control signal for at least one row of pixel circuits included in the display substrate.

In the display device according to at least one embodiment of the present disclosure, the one stage of gate driving unit can provide control signals for at least two rows of pixel circuits included in the display substrate, that is, at least two rows of pixel circuits share the first stage of gate driving unit, which is beneficial to reducing the number of gate driving units and facilitating the realization of a narrow frame.

Figure 42:
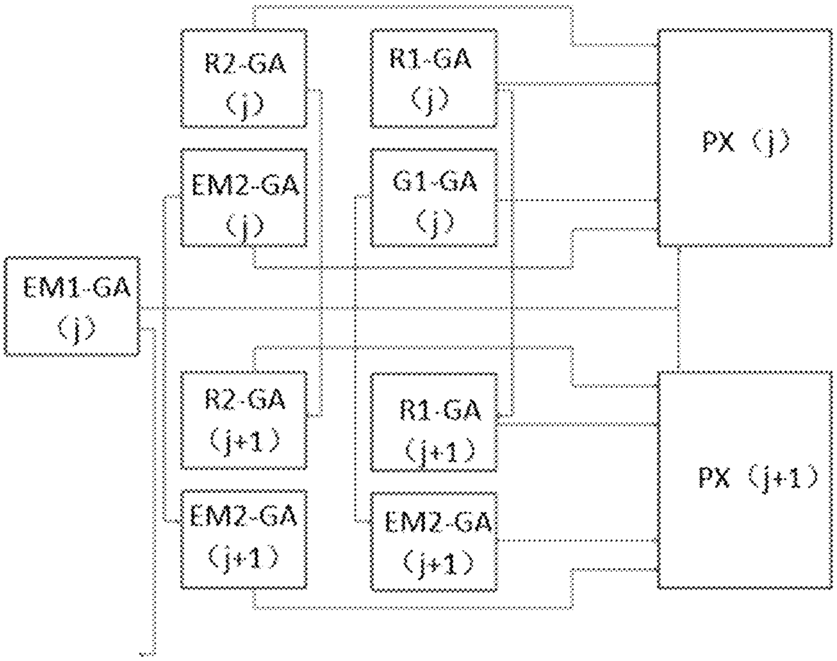
FIG. 42 is a schematic diagram of the connection relationship between the gate driving unit and the pixel circuit included in the display device according to at least one embodiment of the present disclosure.

In FIG. 42, the jth stage of first gate driving unit is labeled EM1-GA(j), and EM1-GA(j) is configured to provide the first light emitting control signal for the jth row of pixel circuit PX(j) and the (j+1)th row of pixel circuit PX(j+1);

EM1-GA(j) is electrically connected to the jth row of pixel circuit PX(j) and the (j+1) row of pixel circuit PX(j+1) at the same time, so as to reduce the number of the first gate driving units configured to provide the first light emitting control signal;

The one labeled R1-GA(j) is the jth stage of second gate driving unit, R1-GA(j) is configured to provide the first reset signal for the jth row of pixel circuit PX(j);

R2-GA(j) is the jth stage of third gate driving unit, R2-GA(j) is configured to provide the second reset signal for the jth row of pixel circuit PX(j);

EM2-GA(j) is the jth stage of fourth gate driving unit, EM2-GA(j) is configured to provide the second light emitting control signal for the jth row of pixel circuit PX(j);

G1-GA(j) is the jth stage of fifth gate driving unit, G1-GA(j) is configured to provide a scanning signal for the jth row of pixel circuit PX(j);

R1-GA(j+1) is the (j+1)th stage of second gate driving unit, R1-GA(j+1) is configured to provide a first reset signal for the (j+1)th row of pixel circuit PX(j+1);

R2-GA(j+1) is the (j+1)th stage of third gate driving unit, R2-GA(j+1) is configured to provide a second reset signal for the (j+1)th row of pixel circuit PX(j+1);

The one labeled EM2-GA(j+1) is the (j+1)th stage of fourth gate driving unit, and EM2-GA(j+1) is configured to provide a second light emitting control signal for the (j+1)th row of pixel circuit PX(j+1);

The one labeled G1-GA(j+1) is the (j+1)th stage of fifth gate driving unit, and G1-GA(j+1) is configured to provide a scanning signal for the (j+1)th row of pixel circuit PX(j+1).

Figure 43:
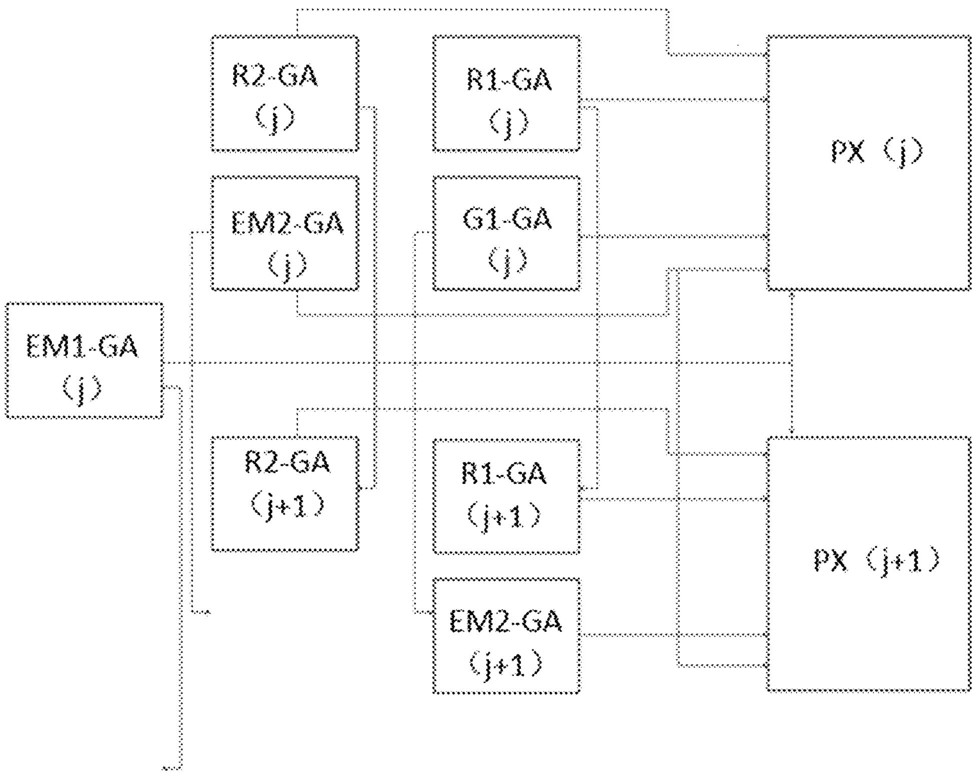
FIG. 43 is a schematic diagram of the connection relationship between the gate driving unit and the pixel circuit included in the display device according to at least one embodiment of the present disclosure.

In FIG. 43, the one labeled EM1-GA(j) is the jth stage of first gate driving unit, and EM1-GA(j) is configured to provide the first light emitting control signal for the jth row of pixel circuit PX(j) and the (j+1)th row of pixel circuit PX(j+1);

EM1-GA(j) is electrically connected to the jth row of pixel circuit PX(j) and the (j+1)th row of pixel circuit PX(j+1) at the same time, so as to reduce the number of first gate driving units configured to provide the first light emitting control signal;

The one labeled R1-GA(j) is the jth stage of second gate driving unit, R1-GA(j) is configured to provide the first reset signal for the jth row of pixel circuit PX(j);

The one labeled R2-GA(j) is the jth stage of third gate driving unit, R2-GA(j) is configured to provide the second reset signal for the jth row of pixel circuit PX(j);

The one labeled EM2-GA(j) is the jth stage of fourth gate driving unit, EM2-GA(j) is configured to provide a second light emitting control signal for the jth row of pixel circuit PX(j) and the (j+1)th row of pixel circuit PX(j+1);

EM2-GA(j) is electrically connected to the jth row of pixel circuit PX(j) and the (j+1)th row of pixel circuit PX(j+1) at the same time, so as to reduce the number of fourth gate driving units configured to provide the second light emitting control signal;

G1-GA(j) is the jth stage of fifth gate driving unit, and G1-GA(j) is configured to provide a scanning signal for the jth row of pixel circuit PX(j);

R1-GA(j+1) is the (j+1)th stage of second gate driving unit, R1-GA(j+1) is configured to provide the first reset signal for the (j+1)th row of pixel circuit PX(j+1);

R2-GA(j+1) is the (j+1)th stage of third gate driving unit, R2-GA(j+1) is configured to provide the second reset signal for the (j+1)th row of pixel circuit PX(j+1);

G1-GA(j+1) is the (j+1)th stage of fifth gate driving unit, G1-GA(j+1) is configured to provide the scanning signal for the (j+1)th row of pixel circuit PX(j+1).

Figure 44:
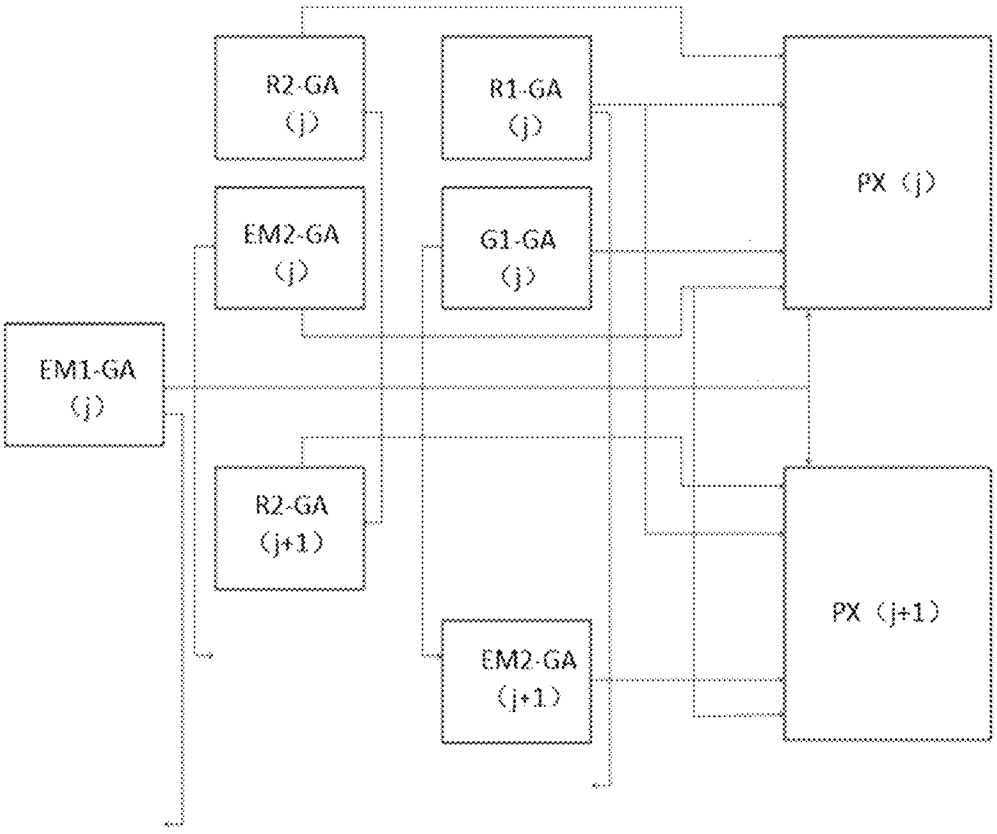
FIG. 44 is a schematic diagram of the connection relationship between the gate driving unit and the pixel circuit included in the display device according to at least one embodiment of the present disclosure.

In FIG. 44, the one labeled EM1-GA(j) is the jth stage of first gate driving unit, and EM1-GA(j) is configured to provide the first light emitting control signal for the jth row of pixel circuit PX(j) and the (j+1)th row of pixel circuit PX(j+1);

EM1-GA(j) is electrically connected to the jth row of pixel circuit PX(j) and the (j+1)th row of pixel circuit PX(j+1) at the same time, so as to reduce the number of first gate driving units configured to provide the first light emitting control signal;

The one labeled R1-GA(j) is the jth stage of second gate driving unit, R1-GA(j) is configured to provide a first reset signal for the jth row of pixel circuit PX(j) and the (j+1)th row of pixel circuit PX(j+1);

R1-GA(j) is electrically connected to the jth row of pixel circuit PX(j) and the (j+1)th row of pixel circuit PX(j+1) at the same time, so as to reduce the number of second gate driving units configured to provide the first reset signal;

The jth stage of third gate driving unit is labeled R2-GA(j), R2-GA(j) is configured to provide a second reset signal for the jth row of pixel circuit PX(j);

The jth stage of fourth gate driving unit is labeled EM2-GA(j) and EM2-GA(j) is configured to provide a second light emitting control signal for the jth row of pixel circuit PX(j) and the (j+1)th row of pixel circuit PX(j+1);

EM2-GA(j) is electrically connected to the jth row of pixel circuit PX(j) and the (j+1)th row of pixel circuit PX(j+1) at the same time, so as to reduce the number of fourth gate driving units configured to provide the second light emitting control signal;

The one labeled G1-GA(j) is the jth stage of fifth gate driving unit, and G1-GA(j) is configured to provide a scanning signal for the jth row of pixel circuit PX(j);

R2-GA(j+1) is the (j+1)th stage of third gate driving unit, and R2-GA(j+1) is configured to provide a second reset signal for the (j+1)th row of pixel circuit PX(j+1);

G1-GA(j+1) is the (j+1) stage of fifth gate driving unit, and G1-GA(j+1) is configured to provide a scanning signal for the (j+1)th row of pixel circuit PX(j+1).

The above descriptions are implementations of the present disclosure. It should be pointed out that those skilled in the art can make some improvements and modifications without departing from the principle of the present disclosure. These improvements and modifications shall also fall within the scope of the present disclosure.

What is claimed is:

1. A display substrate, comprising a plurality of rows of pixel circuits; wherein the pixel circuit includes at least one of a first light emitting control circuit, a second light emitting control circuit, and a first reset circuit; the pixel circuit also includes a light emitting element, a driving circuit, a first energy storage circuit, and a second energy storage circuit;

a control terminal of the driving circuit is electrically connected to a first node, a first terminal of the second energy storage circuit is electrically connected to a second node, a second terminal of the second energy storage circuit is electrically connected to a third node, a first terminal of the first energy storage circuit is electrically connected to the third node, and a second terminal of the first energy storage circuit is electrically connected to a fourth node; the first energy storage circuit and the second energy storage circuit are configured to store electrical energy;

the first light emitting control circuit is electrically connected to a first light emitting control line, the first node, and the fourth node, respectively, and is configured to control the connection between the first node and the fourth node under the control of a first light emitting control signal provided by the first light emitting control line;

the second light emitting control circuit is electrically connected to a second light emitting control line, a power supply voltage terminal, and the first terminal of the driving circuit, is configured to control the connection the power supply voltage terminal and the first terminal of the driving circuit under the control of a second light emitting control signal provided by the second light emitting control line;

the first reset circuit is electrically connected to a first reset line and the third node respectively, and is configured to control a potential of the third node under the control of a first reset signal provided by the first reset line;

the second terminal of the driving circuit is electrically connected to the light emitting element, and the driving circuit is configured to generate a driving current to drive the light emitting element under the control of the potential of the first node;

the control signal line includes at least one of the first light emitting control line, the second light emitting control line, and the first reset line;

control signal lines included in at least two rows of pixel circuits included in the plurality of rows of pixel circuits are electrically connected to each other;

wherein the pixel circuit further includes a second reset circuit;

the second reset circuit is electrically connected to a first reset line and the first node, respectively, is configured to control the potential of the first node under the control of a first reset signal; or, the second reset circuit is electrically connected to a second reset line and the first node, respectively, is configured to control the potential of the first node under the control of a second reset signal provided by the second reset line;

wherein the first reset circuit is also electrically connected to a reference voltage terminal, and is configured to write a reference voltage into the third node under the control of the first reset signal; the reference voltage terminal is configured to provide the reference voltage; the second reset circuit is also electrically connected to the reference voltage terminal, and is configured to write the reference voltage into the first node under the control of the first reset signal; or, the first reset circuit is also electrically connected to the reference voltage terminal, and is configured to write the reference voltage into the third node under the control of the first reset signal; the second reset circuit is also electrically connected to the third node, is configured to control the connection between the first node and the third node under the control of the first reset signal; or, the first reset circuit is also electrically connected to an initial voltage terminal, is configured to write an initial voltage provided by the initial voltage terminal into the third node under the control of the first reset signal; the second reset circuit is also electrically connected to the power supply voltage terminal, is configured to write a power supply voltage provided by the power supply voltage terminal into the first node under the control of the first reset signal.

2. The display substrate according to claim 1, wherein the pixel circuit further includes a data writing-in circuit;

the data writing-in circuit is electrically connected to a scanning line, a data line and the fourth node respectively, and is configured to write a data voltage provided by the data line into the fourth node under the control of a scanning signal provided by the scanning line.

3. The display substrate according to claim 2, wherein the pixel circuit further comprises a third light emitting control circuit;

the third light emitting control circuit is electrically connected to the scanning line, the second node and the first electrode of the light emitting element respectively, and is configured to control the connection between the second node and a first electrode of the light emitting element under the control of the scanning signal provided by the scanning line;

a second electrode of the light emitting element is electrically connected to the first voltage terminal.

4. The display substrate according to claim 2, wherein the pixel circuit further comprises a third light emitting control circuit;

the third light emitting control circuit is electrically connected to a third light emitting control line, the second node and the first electrode of the light emitting element respectively, and is configured to control the connection between the second node and the first electrode of the light emitting element under the control of a third light emitting control signal provided by the third light emitting control line;

the second electrode of the light emitting element is electrically connected to the first voltage terminal.

5. The display substrate according to claim 1, wherein the pixel circuit further comprises a third reset circuit;

the third reset circuit is electrically connected to a second reset line, an initial voltage terminal and a first electrode of the light emitting element, respectively, and is configured to write an initial voltage provided by the initial voltage terminal into the first electrode of the light emitting element under the control of a second reset signal provided by the second reset line.

6. The display substrate according to claim 1, wherein the first light emitting control circuit includes a first transistor, and the second light emitting control circuit includes a second transistor;

a gate electrode of the first transistor is electrically connected to the first light emitting control line, a first electrode of the first transistor is electrically connected to the first node, and a second electrode of the first transistor is electrically connected to the fourth node;

a gate electrode of the second transistor is electrically connected to the second light emitting control line, a first electrode of the second transistor is electrically connected to the power supply voltage terminal, and a second electrode of the second transistor is electrically connected to the first terminal of the driving circuit.

7. The display substrate according to claim 6, wherein, in at least two adjacent rows of pixel circuits included in the plurality of rows of pixel circuit, first light emitting control lines electrically connected to the first transistor are electrically connected to each other; and/or, second light emitting control lines electrically connected to the second transistor are electrically connected to each other.

8. The display substrate according to claim 1, wherein the driving circuit includes a driving transistor, the first energy storage circuit includes a first capacitor, and the second energy storage circuit includes a second capacitor;

a first terminal of the first capacitor is electrically connected to the third node, and a second terminal of the first capacitor is electrically connected to the fourth node;

a first terminal of the second capacitor is electrically connected to the second node, and a second terminal of the second capacitor is electrically connected to the third node;

a gate electrode of the driving transistor is electrically connected to a control terminal of the driving circuit, a first electrode of the driving transistor is electrically connected to a first terminal of the driving circuit, and a second electrode of the driving transistor is electrically connected to a second terminal of the driving circuit.

9. The display substrate according to claim 1, wherein the first reset circuit includes a third transistor, and the second reset circuit includes a fourth transistor;

a gate electrode of the third transistor is electrically connected to the first reset line, a first electrode of the third transistor is electrically connected to the reference voltage terminal or the initial voltage terminal, and a second electrode of the third transistor is electrically connected to the third node;

a gate electrode of the fourth transistor is electrically connected to the first reset line, a first electrode of the fourth transistor is electrically connected to the reference voltage terminal or the power supply voltage terminal, and a second electrode of the fourth transistor is electrically connected to the first node.

10. The display substrate according to claim 1, wherein the first reset circuit includes a third transistor, and the second reset circuit includes a fourth transistor;

a gate electrode of the fourth transistor is electrically connected to the first reset line, a first electrode of the fourth transistor is electrically connected to the reference voltage terminal, and a second electrode of the fourth transistor is electrically connected to the first node.

11. The display substrate according to claim 1, wherein the first reset circuit includes a third transistor, and the second reset circuit includes a fourth transistor;

a gate electrode of the third transistor is electrically connected to the first reset line, a first electrode of the third transistor is electrically connected to the reference voltage terminal, and a second electrode of the third transistor is electrically connected to the third node;

a gate electrode of the fourth transistor is electrically connected to the first reset line, a first electrode of the fourth transistor is electrically connected to the third node, and a second electrode of the fourth transistor is electrically connected to the first node.

12. The display substrate according to claim 9, wherein, in at least two adjacent rows of pixel circuits included in the plurality of rows of pixel circuit, first reset lines electrically connected to the third transistor are electrically connected to each other; and/or, first reset lines electrically connected to the fourth transistor are electrically connected to each other.

13. The display substrate according to claim 3, wherein the data writing-in circuit includes a fifth transistor, and the third light emitting control circuit includes a sixth transistor;

a gate electrode of the fifth transistor is electrically connected to the scanning line, a first electrode of the fifth transistor is electrically connected to the data line, and a second electrode of the fifth transistor is electrically connected to the fourth node;

a gate electrode of the sixth transistor is electrically connected to the scanning line, a first electrode of the sixth transistor is electrically connected to the second node, and a second electrode of the sixth transistor is electrically connected to the first electrode of the light emitting element;

the fifth transistor is an n-type transistor, and the sixth transistor is a p-type transistor; or, the fifth transistor is a p-type transistor, and the sixth transistor is an n-type transistor.

14. The display substrate according to claim 4, wherein the data writing-in circuit includes a fifth transistor, and the third light emitting control circuit includes a sixth transistor;

a gate electrode of the fifth transistor is electrically connected to the scanning line, a first electrode of the fifth transistor is electrically connected to the data line, and a second electrode of the fifth transistor is electrically connected to the fourth node;

a gate electrode of the sixth transistor is electrically connected to the third light emitting control line, a first electrode of the sixth transistor is electrically connected to the second node, and a second electrode of the sixth transistor is electrically connected to the first electrode of the light emitting element.

15. The display substrate according to claim 5, wherein the third reset circuit includes a seventh transistor;

a gate electrode of the seventh transistor is electrically connected to the second reset line, a first electrode of the seventh transistor is electrically connected to the initial voltage terminal, and a second electrode of the seventh transistor is electrically connected to the first electrode of the light emitting element.

16. A driving method, applied to the display substrate according to claim 1, comprising: in at least two rows of pixel circuits included in the plurality of rows of pixel circuits, controlling, by the first light emitting control circuit, the connection between the first node and the fourth node under the control of the first light emitting control signal provided by a same first light emitting control line; and/or, controlling, by the second light emitting control circuit, the connection between the power supply voltage terminal and the first terminal of the driving circuit under the control of the second light emitting control signal provided by a same second light emitting control line; and/or, controlling, by the first reset circuit, the potential of the third node under the control of the first reset signal provided by a same first reset line.

17. A display device, comprising the display substrate according to claim 1.

18. The display device according to claim 17, further comprising a gate driving circuit, wherein the gate driving circuit comprises a plurality of stages of gate driving units;

the gate driving circuit is electrically connected to a control signal line, is configured to provide a control signal to the control signal line;

one stage of gate driving unit provides a control signal to at least one row of pixel circuits included in the display substrate.

* * * * *